US009529012B2

(12) United States Patent
Lin et al.

(10) Patent No.: US 9,529,012 B2
(45) Date of Patent: Dec. 27, 2016

(54) MICRO-ELECTRO MECHANICAL APPARATUS WITH INTERDIGITATED SPRING

(71) Applicant: Industrial Technology Research Institute, Hsinchu (TW)

(72) Inventors: Shih-Chieh Lin, Kaohsiung (TW); Chao-Ta Huang, Hsinchu (TW); Chung-Yuan Su, Taichung (TW); Yu-Wen Hsu, Tainan (TW)

(73) Assignee: Industrial Technology Research Institute, Hsinchu (TW)

( * ) Notice: Subject to any disclaimer, the term of this patent is extended or adjusted under 35 U.S.C. 154(b) by 379 days.

(21) Appl. No.: 14/151,843

(22) Filed: Jan. 10, 2014

(65) Prior Publication Data

US 2014/0245832 A1    Sep. 4, 2014

(30) Foreign Application Priority Data

Mar. 1, 2013 (TW) .............................. 102107354 A

(51) Int. Cl.
G01P 15/08    (2006.01)
G01P 15/125    (2006.01)

(52) U.S. Cl.
CPC ..... *G01P 15/125* (2013.01); *G01P 2015/0814* (2013.01); *G01P 2015/0857* (2013.01)

(58) Field of Classification Search
CPC ............ G01P 15/125; G01P 2015/0814; G01P 2015/0857

(Continued)

(56) References Cited

U.S. PATENT DOCUMENTS 5,834,332 A    11/1998    Hierold et al.
5,948,982 A    9/1999    Woodruff et al.
(Continued)

FOREIGN PATENT DOCUMENTS

CN    101013637    8/2007
CN    101458262    6/2009
(Continued)

OTHER PUBLICATIONS

"Office Action of Chinese Counterpart Application", issued on Sep. 30, 2015, p. 1-p. 5, in which the listed reference was cited.
(Continued)

*Primary Examiner* — Paul West
*Assistant Examiner* — Xin Zhong
(74) *Attorney, Agent, or Firm* — Jianq Chyun IP Office

(57) ABSTRACT

A micro-electro mechanical apparatus with interdigitated spring including a substrate, at least one first mass, a movable electrode, a stationary electrode, an anchor and an interdigitated spring is provided. The movable electrode is disposed on the mass along an axial direction. The stationary electrode is disposed on the substrate along the axial direction, and the movable electrode and the stationary electrode have a critical gap there between. The interdigitated springs connects the mass and the anchor along the axial direction. The interdigitated spring includes first folded portions, first connecting portions, second folded portions, and second connecting portions. Each first folded portion includes two first spans and a first head portion. Each second folded portion includes two second spans and a second head portion. A width of the first span and a width of the second span are greater than the critical gap respectively.

26 Claims, 24 Drawing Sheets

(58) Field of Classification Search
USPC .............. 73/514.38, 514.32, 504.03, 504.12
See application file for complete search history.

(56) References Cited

U.S. PATENT DOCUMENTS

| | | | |
|---|---|---|---|
| 6,450,029 B1 | 9/2002 | Sakai et al. | |
| 6,450,033 B1 * | 9/2002 | Ito .................. | B81B 3/0051 73/514.29 |
| 6,924,581 B2 * | 8/2005 | Greywall ............. | B81B 3/0051 310/309 |
| 7,412,888 B2 | 8/2008 | Chu et al. | |
| 7,784,344 B2 * | 8/2010 | Pavelescu ............. | G01D 21/02 73/510 |
| 8,113,054 B2 | 2/2012 | Je et al. | |
| 2008/0000296 A1 | 1/2008 | Johnson | |
| 2009/0256297 A1 * | 10/2009 | Geisberger ........... | G01P 15/125 267/160 |
| 2012/0042729 A1 | 2/2012 | Wang | |

FOREIGN PATENT DOCUMENTS

| | | |
|---|---|---|
| CN | 101666813 | 3/2010 |
| CN | 101738496 | 6/2010 |
| CN | 101871951 | 10/2010 |
| CN | 102086017 | 6/2011 |
| CN | 102375075 | 3/2012 |
| TW | 200912317 | 3/2009 |
| TW | 200944466 | 11/2009 |
| TW | 201011297 | 3/2010 |
| TW | 201123927 | 7/2011 |

OTHER PUBLICATIONS

"Office Action of Taiwan Counterpart Application", issued on Sep. 2, 2014, p. 1-p. 7, in which the listed references were cited.

Hsu et al., "New capacitive low-g triaxial accelerometer with low cross-axis sensitivity," Journal of Micromechanics and Microengineering 20, Apr. 23, 2010, pp. 1-10.

Bais et al., "Mechanical Sensitivity Enhancement of an Area-Changed Capacitive Accelerometer by Optimization of the Device Geometry," Analog Integrated Circuits and Signal Processing 44, Aug. 2005, pp. 175-183.

Zhou et al., "A single-Axis Area Changeable Capacitive Accelerometer with Folded Springs," Proceedings of the 3rd IEEE Int. Conf. on Nano/Micro Engineered and Molecular Systems, Jan. 6-9, 2008, pp. 128-131.

Fengli et al., "Polysilicon comb micro-accelerometer system design and FEM simulation," Sixth Intl. Symp. on Instrumentation and Control Technology: Sensors, Automatic Measurement, Control, and Computer Simulation, Proc. of SPIE vol. 6358, Nov. 8, 2006, pp. 635803-1-6.

Dong et al., "Design considerations of electrostatic forces in microaccelerometers," Smart Sensors, Actuators, and MEMS, Proceedings of SPIE vol. 5116, May 19-21, 2003, pp. 690-698.

Krishnamoorthy et al., "In-plane MEMS-based nano-g accelerometer with sub-wavelength optical resonant sensor," Sensors and Actuators A 145-146, Mar. 2008, pp. 283-290.

* cited by examiner

MICRO-ELECTRO MECHANICAL APPARATUS WITH INTERDIGITATED SPRING

CROSS-REFERENCE TO RELATED APPLICATION

This application claims the priority benefit of Taiwan application serial no. 102107354, filed on Mar. 1, 2013. The entirety of the above-mentioned patent application is hereby incorporated by reference herein and made a part of this specification.

BACKGROUND

Technical Field

The disclosure relates to a micro-electro mechanical apparatus. Particularly, the disclosure relates to a micro-electro mechanical apparatus with interdigitated spring.

Related Art

In recent years, with the development of electronic products such as smart phones, tablet PCs, game consoles, etc., micro-electro mechanical inertial sensors such as accelerometers, gyroscopes, oscillators, etc. are widely used in the aforementioned electronic products. The market for these products has significantly increased each year. Currently, techniques of the micro-electro mechanical inertial sensors have gradually matured, and the miniaturization, high on-axis sensitivity, low off-axis sensitivity and high process variation tolerance have become competitive factors in the current micro-electro mechanical inertial sensors market.

However, when a mass of the current micro-electro mechanical inertial sensor is miniaturized, a conventional spring is proportionally scaled-down in a same manner, such that stiffness of the conventional spring is excessively high. This decreases accuracy and sensitivity. Moreover, when the mass of the micro-electro mechanical inertial sensor is miniaturized, a more precise fabrication process is adopted to fabricate the conventional spring. Thus, a width of the conventional spring becomes smaller, which decreases the tolerance of fabricating error, and induces larger resonance frequency drift.

FIG. 1A is a schematic diagram of a micro-electro mechanical accelerometer. FIG. 1B is a schematic diagram of the micro-electro mechanical accelerometer of FIG. 1A with a miniaturized mass. Referring to FIG. 1A, the micro-electro mechanical accelerometer 10 includes a mass 12, springs 14 and sensing electrodes 16, where stiffness of the spring 14 is K. Each of the sensing electrodes 16 includes a stationary electrode 16a and a movable electrode 16b. When acceleration is applied along an X-axis direction, the mass 12 translates along the X-axis direction, and the distance between the stationary electrode 16a and the movable electrode 16b is changed to cause a capacitance variation. By sensing the capacitance variation, the acceleration can be calculated.

Then, referring to FIG. 1B, the micro-electro mechanical accelerometer 20 includes a mass 22, springs 24 and sensing electrodes 26, where stiffness of the spring 24 is k. Each of the sensing electrodes 26 includes a stationary electrode 26a and a movable electrode 26b.

In the micro-electro mechanical accelerometer, when the mass is scaled-down, it is difficult to reduce the stiffness of the spring. When the stiffness of the spring is excessively high, the displacement along a sensing axis is decreased. This is detrimental for sensing small acceleration and decreases the sensitivity of the accelerometer. When the stiffness of the spring is excessively low, the off-axis acceleration increases the displacement along the sensing axis which decreases the accuracy. In order to keep the same sensitivity, the same displacement should be maintained when the dimension of the accelerometer is scaled down. For example, when the side length L2 in FIG. 1B is one half of the side length L1 in FIG. 1A, the stiffness of the spring 24 of the mass 22 has to be decreased to one quarter of the stiffness of the spring 14 of the mass 12. It can be found in the following equation.

$$\begin{cases} F = M \cdot g = K\Delta y \\ f = m \cdot g = \left(\frac{1}{4}M\right) \cdot g \\ \quad = \frac{1}{4} M \cdot g = \frac{1}{4} K \Delta y = k \Delta y \end{cases}$$

$$\Rightarrow k = \frac{1}{4} K$$

In the above equation, F is a force applied on mass 12, f is a force applied on mass 22, M is a mass of mass 12, m is a mass of mass 22, and $\Delta y$ is a displacement of mass 12.

FIG. 2A is a schematic diagram of a micro-electro mechanical resonator. FIG. 2B is a schematic diagram of the miniaturized micro-electro mechanical resonator according to FIG. 2A. Referring to FIG. 2A, the micro-electro mechanical resonator 30 includes a mass 32, springs 34, sensing electrodes 36 and driving electrodes 38. Each sensing electrode 36 includes a stationary electrode 36a and a movable electrode 36b. Each driving electrode 38 includes a stationary electrode 38a and a movable electrode 38b. The mass 32 is driven by the electrode 38 to oscillate. When the mass 32 reaches a resonance frequency, the mass 32 has a maximum displacement, and the sensing electrode 36 senses a maximum capacitance variation.

Referring to FIG. 2B, the micro-electro mechanical resonator 30' includes a mass 32', springs 34', sensing electrodes 36' and driving electrodes 38'. Each sensing electrode 36' includes a stationary electrode 36'a and a movable electrode 36'b. Each driving electrode 38' includes a stationary electrode 38'a and a movable electrode 38'b. When the micro-electro mechanical resonator 30 is miniaturized to the micro-electro mechanical resonator 30', the width of the spring 34 has to be accordingly narrowed so that the miniaturized micro-electro mechanical resonator 30' can achieve the same resonance frequency as that of the micro-electro mechanical resonator 30. The narrowed spring width can be obtained according to a following equation (3) by substituting an equation (1) into an equation (2):

$$k = \frac{n_p}{n_s} \cdot E \cdot t \cdot \left(\frac{w}{L}\right)^3 \qquad (1)$$

$$f = \frac{1}{2\pi} \sqrt{\frac{k}{m}} \qquad (2)$$

$$w = L \cdot \left[\frac{n_s}{n_p} \cdot \frac{4\pi^2 \cdot f^2 \cdot m}{E \cdot t}\right]^{1/3} \qquad (3)$$

where f is the resonance frequency, k is the stiffness of the folded spring, m is a mass value of the mass, $n_p$ is a number of folded springs disposed at a same side, $n_s$ is a number of folded portions of each folded spring, E is a Young's modulus of the folded spring, t is a thickness of the folded spring, w is a width of the folded spring and L is a length of the folded spring.

Under the same fabrication process variation (for example, variation of width), the effect on the spring with a narrower width is greater than that on the spring with a wider width. The spring with the narrower width results in the micro-electro mechanical resonator 30' having a larger frequency drift. More precisely, there is a large difference between a designed resonance frequency and a measured resonance frequency of the micro-electro mechanical resonator 30'.

FIG. 3 is a schematic diagram of a micro-electro mechanical gyroscope. Referring to FIG. 3, the micro-electro mechanical gyroscope 40 includes an accelerometer 50 and a resonator 60. The accelerometer 50 includes a first mass 52. The resonator 60 includes a second mass 62. When the second mass 62 oscillates along a Y-axis at resonance frequency, the first mass 52 is driven to oscillate along the Y-axis. When an angular velocity is applied along a Z-axis, the first mass 52 translates along the X-axis, and a distance between a movable electrode 52b on the first mass 52 and a stationary electrode on a substrate SUB 1 is changed. This causes a capacitance variation. Then, by sensing the capacitance variation, the magnitude of the angular velocity can be calculated. However, when the accelerometer 50 is miniaturized, sensitivity and accuracy of the accelerometer 50 are decreased, and when the resonator 60 is miniaturized, the resonator 60 may have larger frequency drift.

According to the aforementioned examples, it is known that "how to miniaturize the micro-electro mechanical inertia sensors such as an accelerometer, resonator, or gyroscope" has become a critical issue in the development of micro-electro mechanical inertial sensors. That is to say, for the purpose of miniaturizing the micro-electro mechanical inertial sensors, a spring with a wider width and lower stiffness on a sensing axis is required to match the miniaturized micro-electro mechanical inertia sensors.

FIG. 4 is a schematic diagram of an electromagnetically driven vibrating accelerometer. Referring to FIG. 4, it discloses an electromagnetically driven vibrating accelerometer 70, in which a mass 74 vibrates when an electric current passes through a driving spring 72. When the acceleration is sensed, the vibration frequency of the mass 74 is changed. Then, by detecting the variation of the vibration frequency, the magnitude of the acceleration can be calculated.

FIG. 5 is a schematic diagram of a micromechanical semiconductor device. Referring to FIG. 5, it discloses a micromechanical semiconductor device 80, in which a spring 82 has lower stiffness along a vertical direction (a Z-axis direction), such that a mass 84 is capable of moving vertically along the Z-axis direction.

FIG. 6 is a schematic diagram of a semiconductor physical quantity sensor. Referring to FIG. 6, it discloses a semiconductor physical quantity sensor 90, in which a bridge 92 is respectively connected to a connecting portion 94a of an inner spring 94 and a connecting portion 96a of an outer spring 96 to suppress the influence of the off-axis acceleration.

SUMMARY

The disclosure provides a micro-electro mechanical apparatus adapted to sense an acceleration. The micro-electro mechanical apparatus includes a substrate, a first mass, a movable electrode, a stationary electrode, an anchor, and an interdigitated spring. The movable electrode is disposed on the first mass along a first axial direction. The stationary electrode is disposed on the substrate along the first axial direction, wherein the movable electrode and the stationary electrode have a critical gap there between. The interdigitated spring connects the first mass and the anchor along the first axial direction. The interdigitated spring includes a plurality of first folded portions, a plurality of first connecting portions, a plurality of second folded portions, and a plurality of second connecting portions. Each of the first folded portions includes two first spans and a first head portion configured to connect the two first spans. Each of the first connecting portions is respectively connected to the first spans of two adjacent first folded portions to define a first space. Each of the second folding portions includes two second spans and a second head portion configured to connect the two second spans. Each of the second connecting portions is respectively connected to the second spans of two adjacent second folded portions to define a second space. At least one of the first folded portions is disposed in the second space, and at least one of the second folded portions is disposed in the first space, a width of the first span is greater than the critical gap and a width of the second span is greater than the critical gap.

The disclosure provides a micro-electro mechanical apparatus adapted to sense an acceleration. The micro-electro mechanical apparatus includes a substrate, a first mass, a second mass, a movable electrode, a stationary electrode, an anchor, and an interdigitated spring. The movable electrode is disposed on the second mass along a second axial direction. The stationary electrode is disposed on the substrate along the second axial direction, wherein the movable electrode and the stationary electrode have a critical gap there between. The interdigitated spring connects the second mass and the anchor along the second axial direction. The interdigitated spring includes a plurality of first folded portions, a plurality of first connecting portions, a plurality of second folded portions, and a plurality of second connecting portions. Each of the first folded portions includes two first spans and a first head portion configured to connect the two first spans. Each of the first connecting portions is respectively connected to the first spans of two adjacent first folded portions to define a first space. Each of the second folding portions includes two second spans and a second head portion configured to connect the two second spans. Each of the second connecting portions is respectively connected to the second spans of two adjacent second folded portions to define a second space. At least one of the first folded portions is disposed in the second space, and at least one of the second folded portions is disposed in the first space, a width of the first span is greater than the critical gap and a width of the second span is greater than the critical gap.

The disclosure provides a micro-electro mechanical apparatus. The micro-electro mechanical apparatus includes a substrate, at least one mass, a movable electrode, a stationary electrode, an anchor, and an interdigitated spring. The movable electrode is disposed on the mass along an axial direction. The stationary electrode is disposed on the substrate along the axial direction, wherein the movable electrode and the stationary electrode have a critical gap there between. The interdigitated spring connects the mass and the anchor. The interdigitated spring includes a plurality of first folded portions, a plurality of first connecting portions, a plurality of second folded portions, and a plurality of second connecting portions. Each of the first folded portions includes two first spans and a first head portion configured to connect the two first spans. Each of the first connecting portions is respectively connected to the first spans of two adjacent first folded portions to define a first space. Each of the second folding portions includes two second spans and a second head portion configured to connect the two second spans. Each of the second connecting portions is respectively connected to the second spans of two adjacent second folded portions to define a second space. At least one of the first folded portions is disposed in the second space, and at least one of the second folded portions is disposed in the first space, a width of the first span is greater than the critical gap and a width of the second span is greater than the critical gap.

The disclosure provides a method for mitigating frequency drift of a micro-electro mechanical apparatus. The method includes using an interdigitated spring to connect at least one mass and an anchor of the micro-electro mechanical apparatus, wherein the interdigitated spring includes a plurality of first folded portions, a plurality of first connecting portions, a plurality of second folded portions, and a plurality of second connecting portions. Each of the first folded portions includes two first spans and a first head portion configured to connect the two first spans. Each of the first connecting portions is respectively connected to the first spans of two adjacent first folded portions to define a first space. Each of the second folding portions includes two second spans and a second head portion configured to connect the two second spans. Each of the second connecting portions is respectively connected to the second spans of two adjacent second folded portions to define a second space. Arranging at least one of the first folded portions in the second space, and arranging at least one of the second folded portions in the first space; and defining the width of the first span which is greater than a critical gap and defining a width of the second span which is greater than a critical gap, wherein the critical gap is located between a movable electrode and a stationary electrode of the micro-electro mechanical apparatus.

In order to make the aforementioned and other features and advantages of the disclosure comprehensible, several exemplary embodiments accompanied with drawings are described in detail below.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

First Embodiment

Figure 1A:
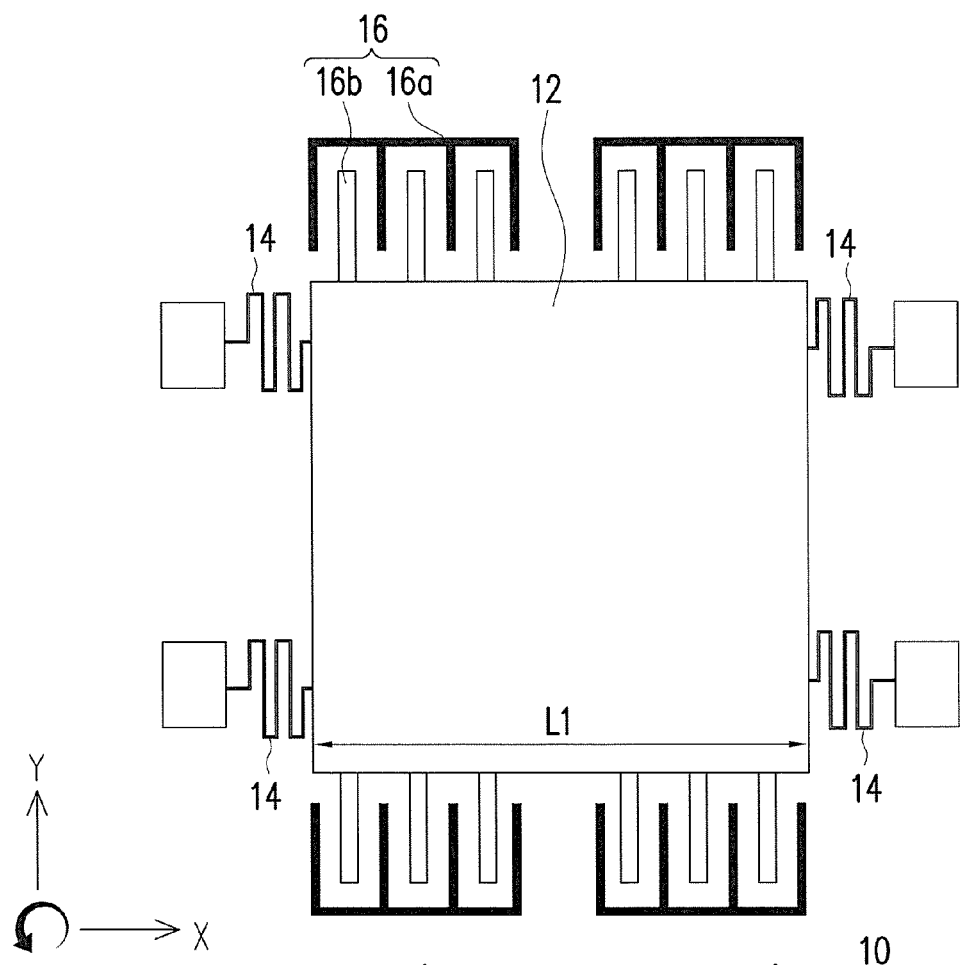
FIG. 1A is a schematic diagram of a micro-electro mechanical accelerometer.
Figure 1B:
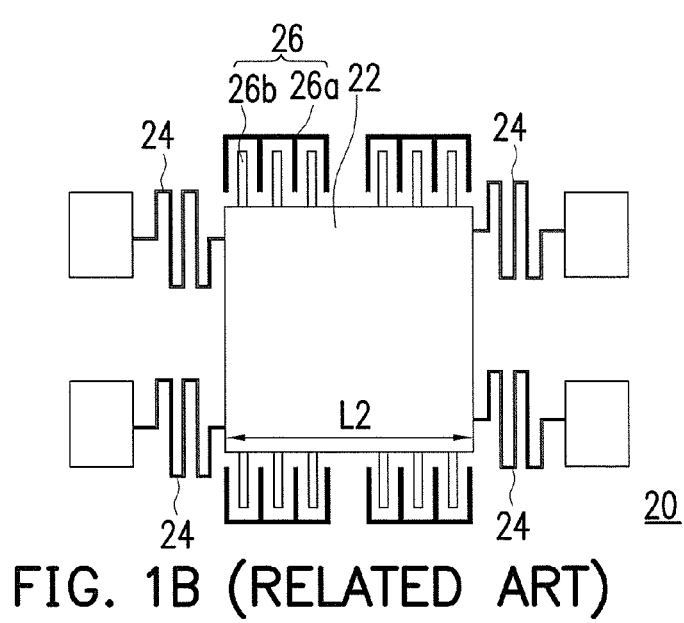
FIG. 1B is a schematic diagram of the micro-electro mechanical accelerometer of FIG. 1A with a scaled-down mass.
Figure 2A:
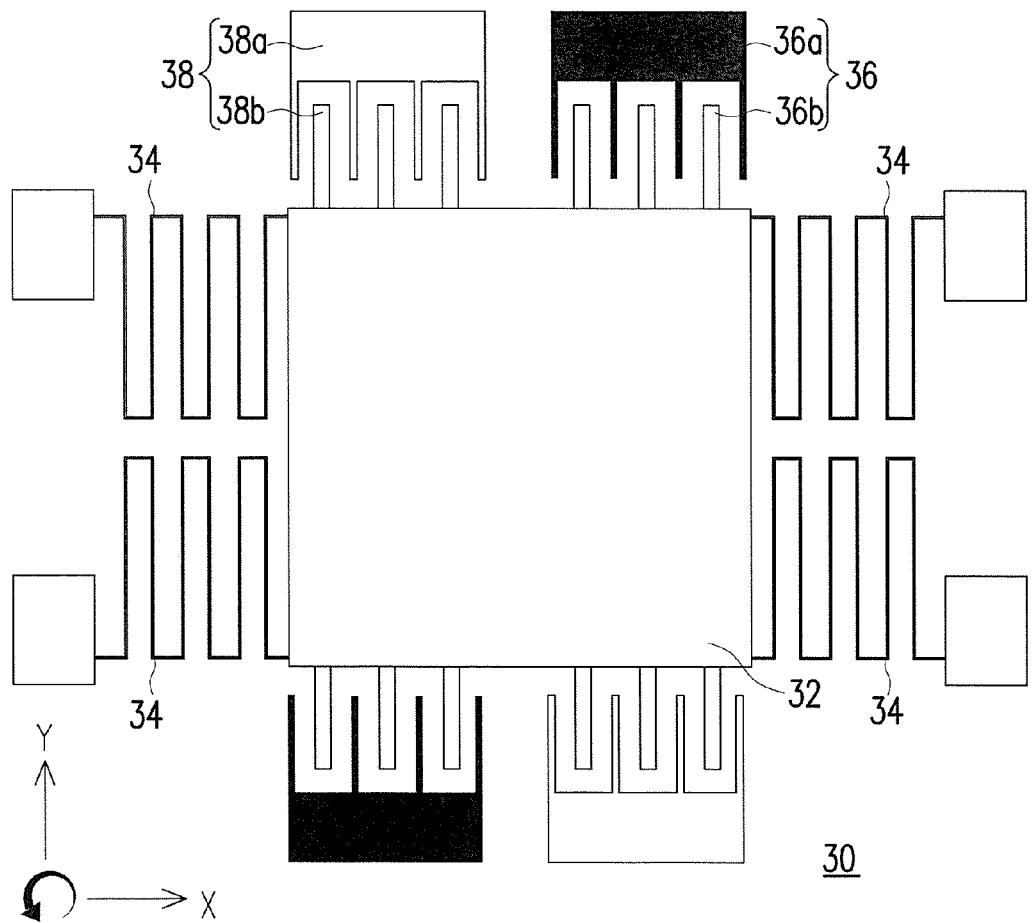
FIG. 2A is a schematic diagram of a micro-electro mechanical resonator.
Figure 2B:
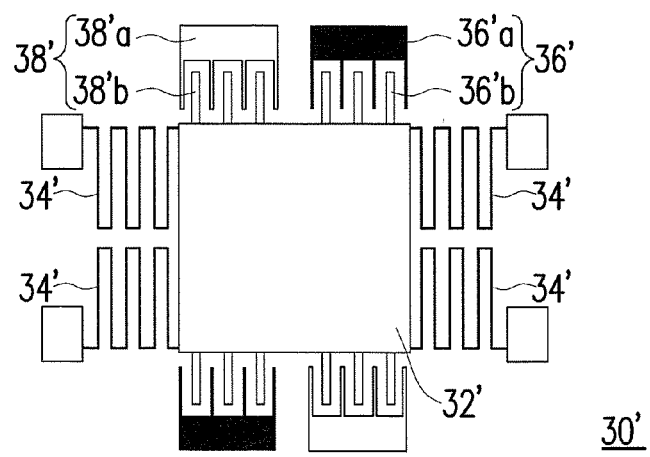
FIG. 2B is a schematic diagram of the miniaturized micro-electro mechanical resonator according to FIG. 2A.
Figure 3:
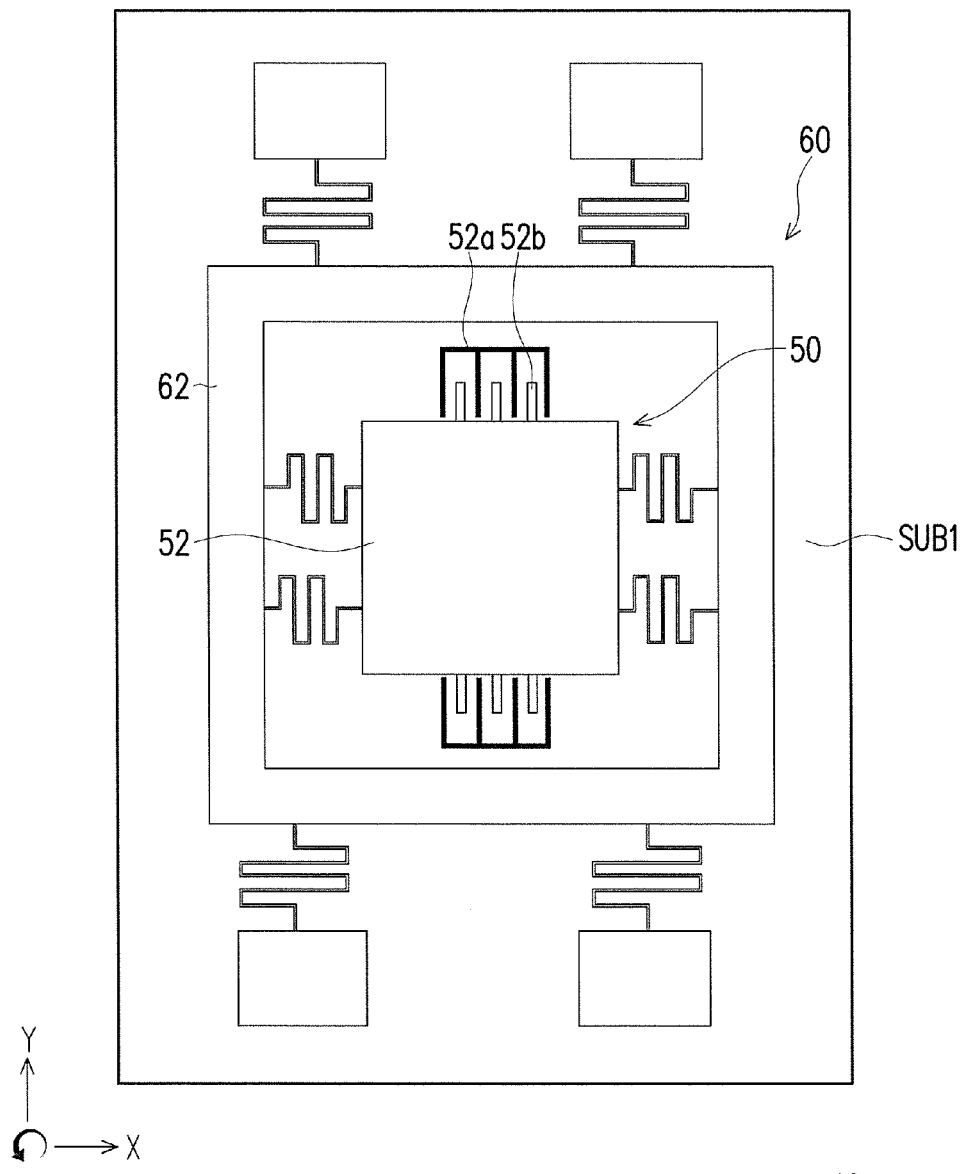
FIG. 3 is a schematic diagram of a micro-electro mechanical gyroscope.
Figure 4:
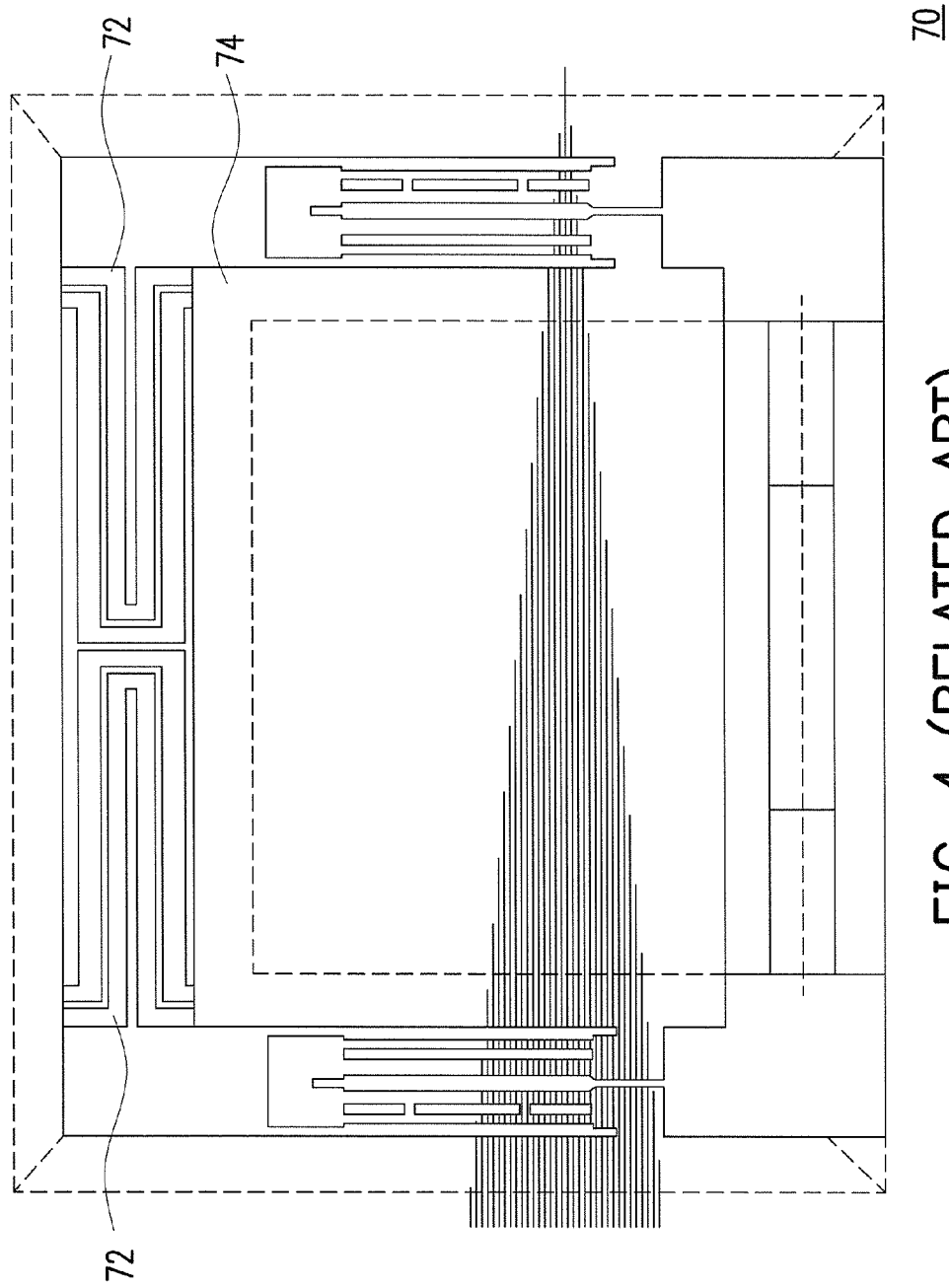
FIG. 4 is a schematic diagram of an electromagnetically driven vibrating accelerometer.
Figure 5:
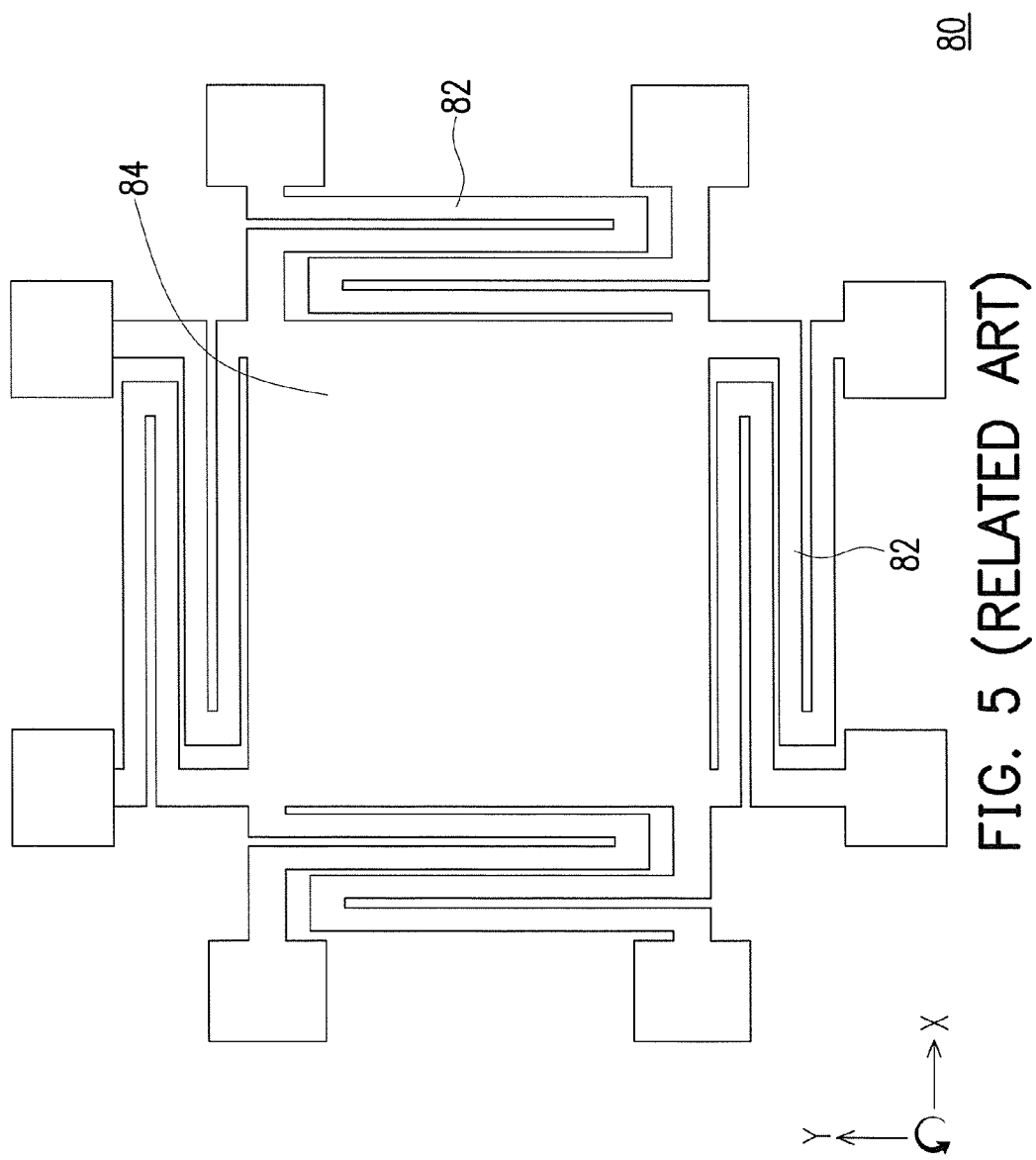
FIG. 5 is a schematic diagram of a micromechanical semiconductor device.
Figure 6:
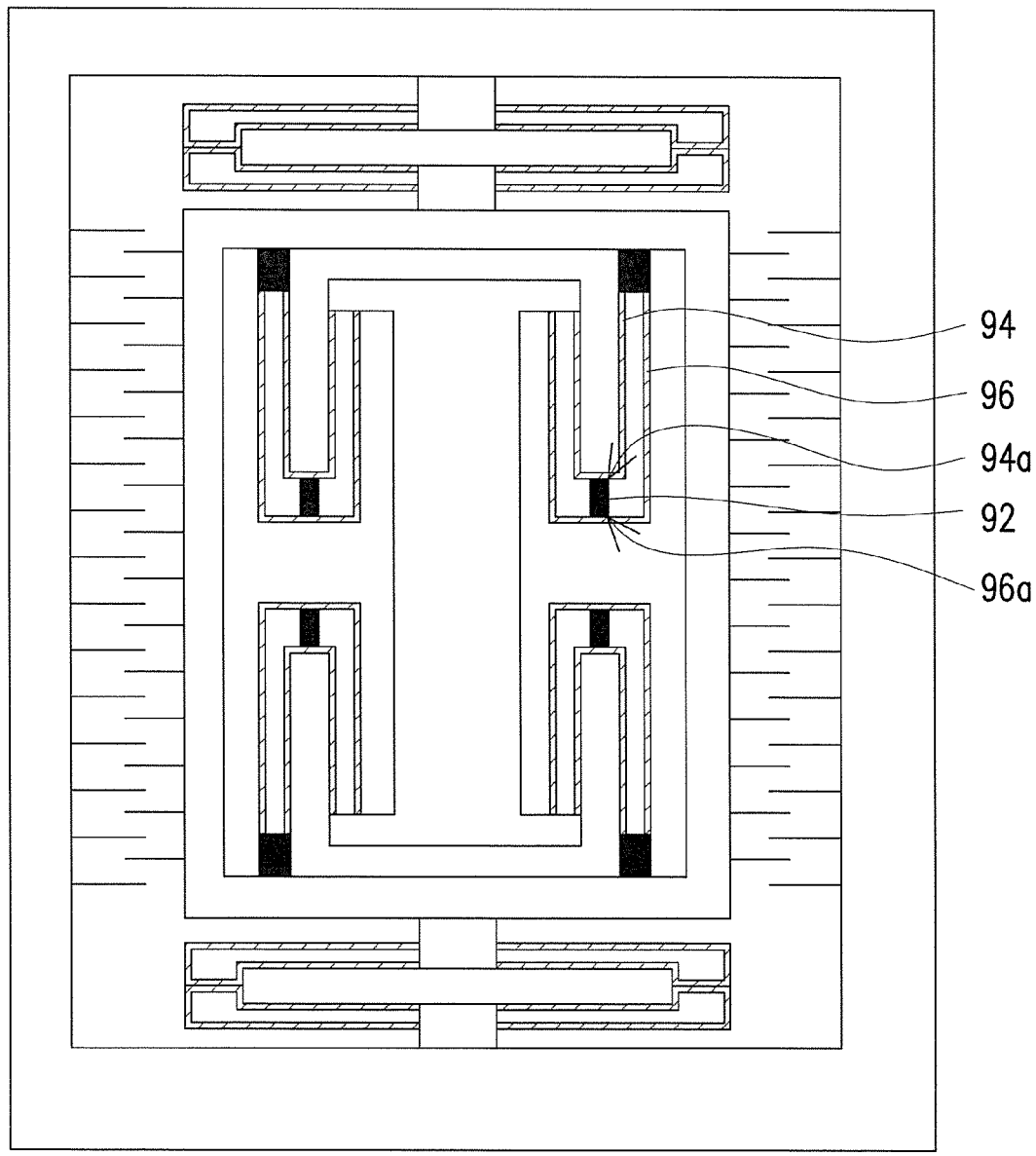
FIG. 6 is a schematic diagram of a semiconductor physical quantity sensor.
Figure 7A:
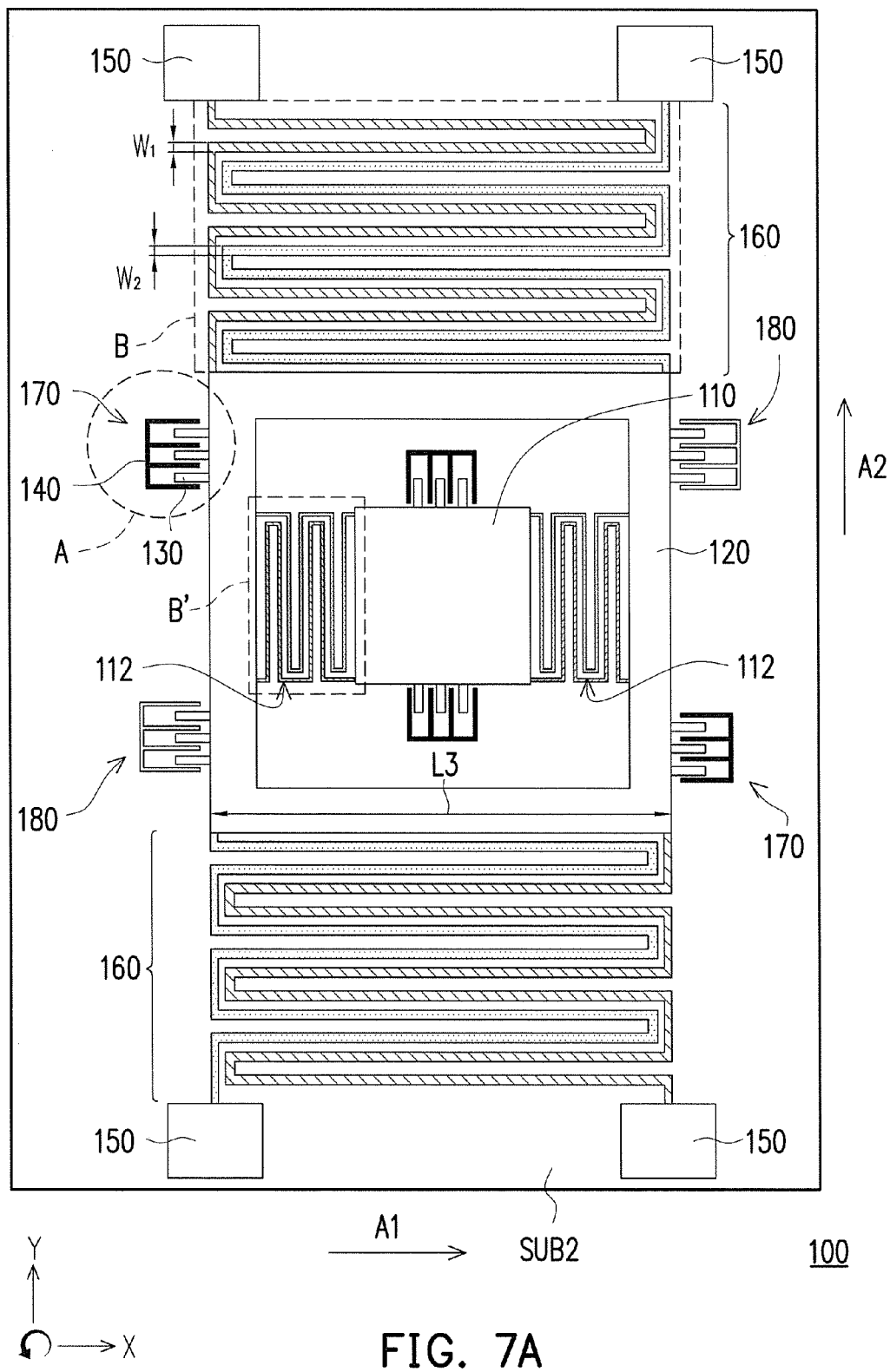
FIG. 7A is a schematic diagram of a micro-electro mechanical apparatus according to the first embodiment of the disclosure.
Figure 7B:
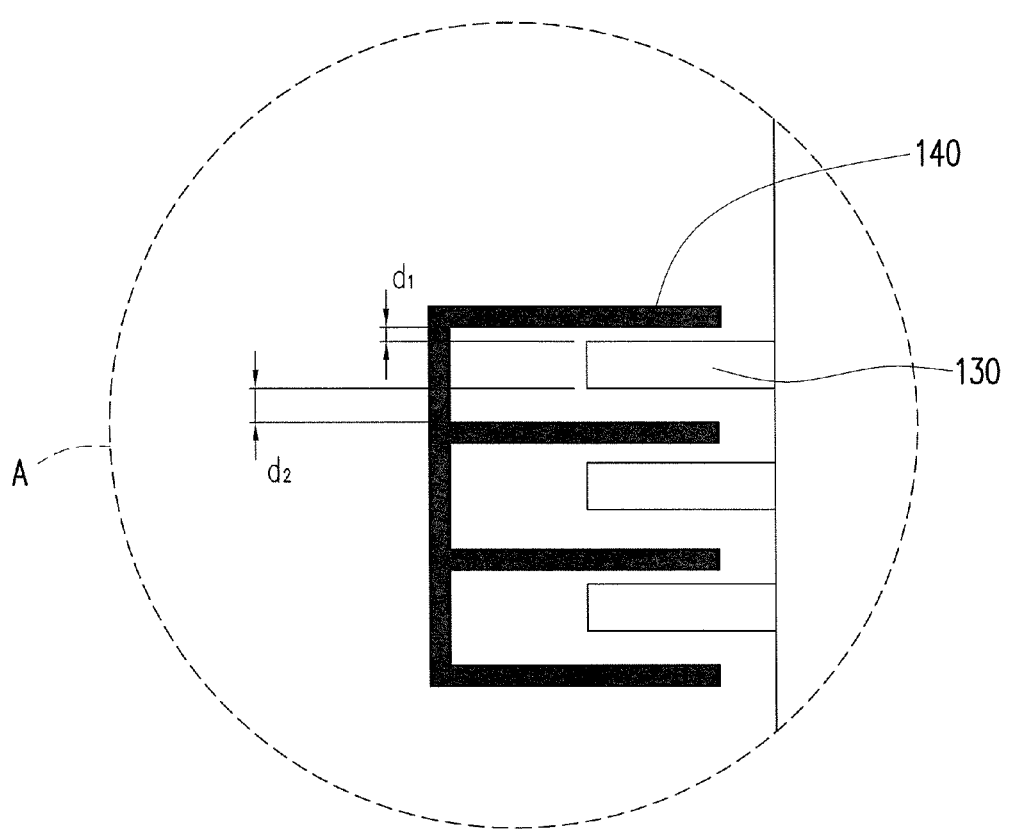
FIG. 7B is a partial enlarged view of a region A of the micro-electro mechanical apparatus of FIG. 7A.

FIG. 7A is a schematic diagram of a micro-electro mechanical apparatus according to the first embodiment of the disclosure. FIG. 7B is a partial enlarged view of a region A of the micro-electro mechanical apparatus of FIG. 7A. Referring to FIG. 7A, the micro-electro mechanical apparatus 100 is, for example, a micro-electro mechanical gyroscope adapted to sense an angular velocity, and includes a substrate SUB2, a first mass 110, a second mass 120, movable electrodes 130, stationary electrodes 140, anchors 150 and a first interdigitated spring 160.

The second mass 120 is, for example, a frame structure, the first mass 110 is disposed in the second mass 120, and a second interdigitated spring 112 is connected to the first mass 110 and the second mass 120 along a first axial direction A1. The movable electrodes 130 are disposed at two opposite sides of the second mass 120 along a second axial direction A2. The stationary electrodes 140 are disposed on the substrate SUB2 along the second axial direction A2, where the stationary electrodes 140 and the movable electrodes 130 form a sensing electrode 170 and a driving electrode 180. The movable electrode 130 of the sensing electrode 170 and the stationary electrode 140 of the sensing electrode 170 has a critical gap there between, and the critical gap is formed between the movable electrode 130 and the stationary electrode 140 through an etching process. Further, as shown in FIG. 7B, after the movable electrode 130 and the stationary electrode 140 are formed through the etching process and before the second mass 120 is driven, the movable electrode 130 and the stationary electrode 140 have a first gap d1 and a second gap d2 there between, where the first gap d1 is not equal to the second gap d2. The critical gap is defined as a smaller one of the first gap d1 and the second gap d2. In the present embodiment, the first gap d1 can be 2 μm and the second gap d2 can be 6 μm, i.e. the first gap d1 is smaller than the second gap d2. According to such design, the capacitance variation sensed by the sensing electrode 170 may perform better linearity. The critical gap is the first gap d1, which is the smaller one of the first gap d1 and the second gap d2. In other words, the critical gap between the movable electrode 130 and the stationary electrode 140 is 2 μm.

Figure 7C:
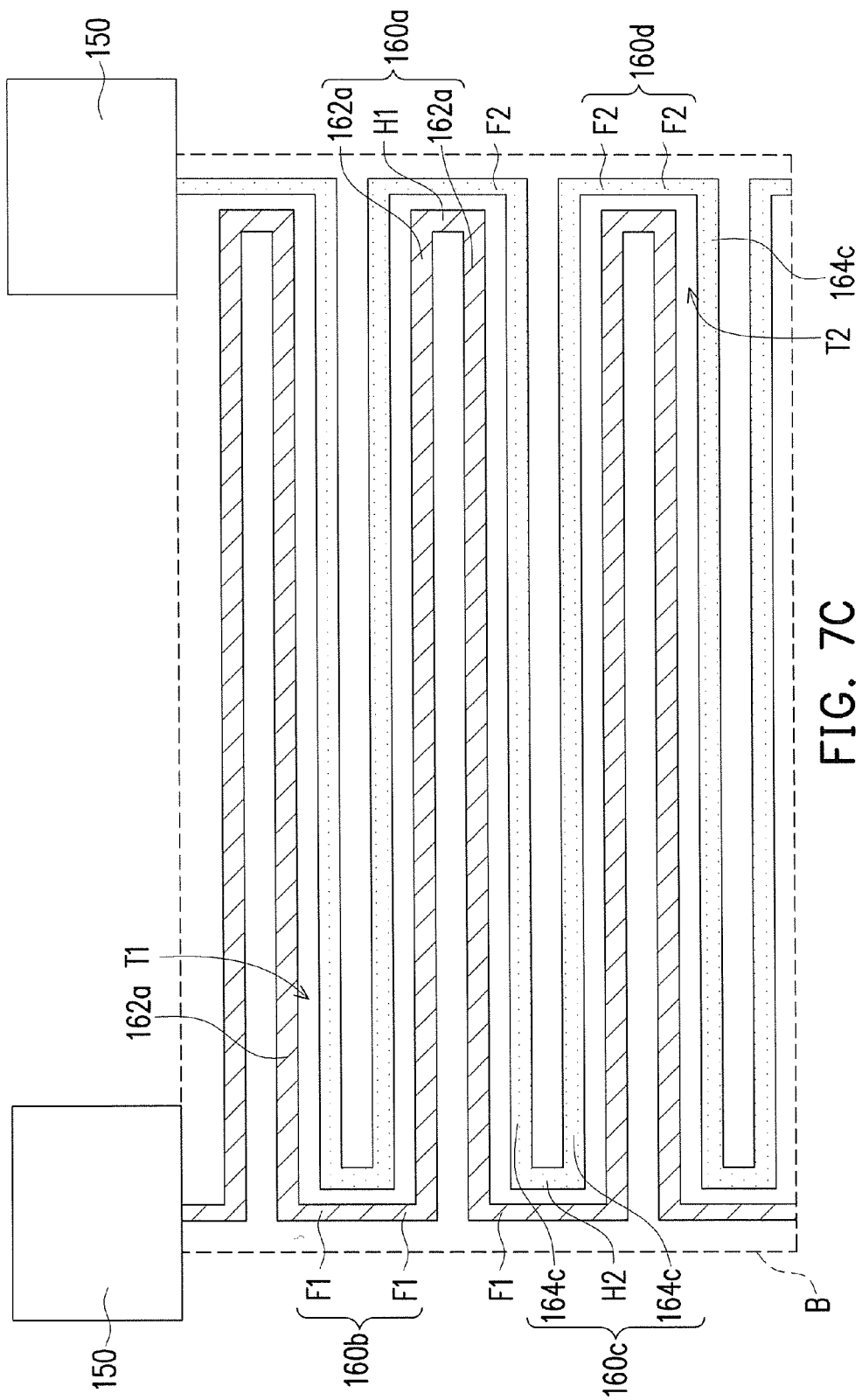
FIG. 7C is a partial enlarged view of a region B of the micro-electro mechanical apparatus of FIG. 7A.
Figure 7C:
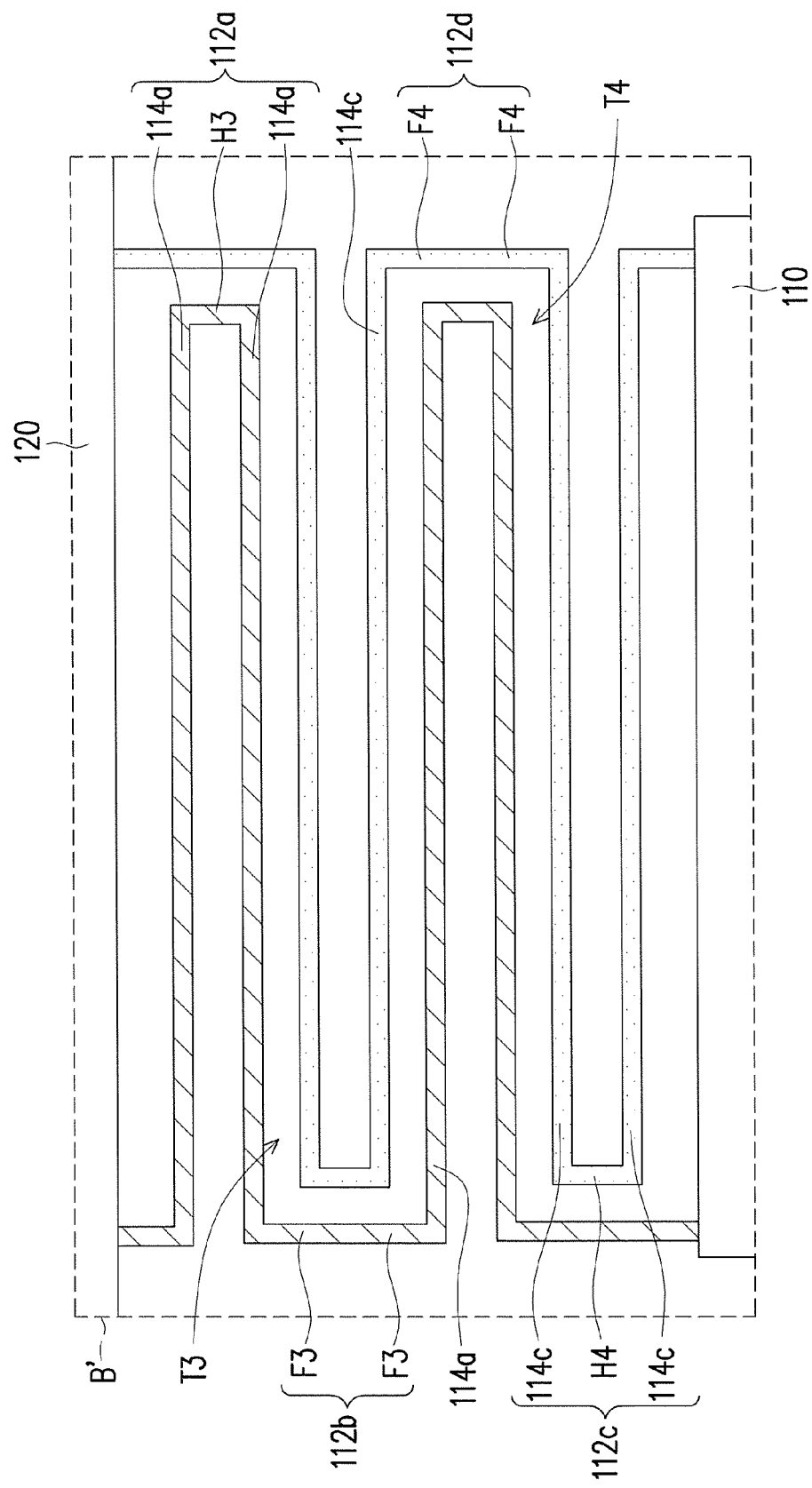

Moreover, in the present embodiment, although a folded spring is not adopted, the length of the folded spring can be one half of the side length of the second mass 120, and a width of the folded spring is calculated according to the aforementioned equation (3). The calculated width of the folded spring can be used as a reference for the design of the interdigitated spring and can be defined as a "resonance spring width". It should be noticed that when the "resonance spring width" of the present embodiment is to be calculated, f of the equation (3) is a resonance frequency of the second mass 120, m is a mass of the second mass 120, L3 is a side length (which is parallel to the first axial direction A1) of the second mass 120, L is a length of the folded spring and is equal to a half of the side length of the second mass 120 (i.e. L=L3/2), $n_p$ is a number of the folded springs configured at a same side, $n_s$ is a number of folded portions of a single folded spring, E is a Young's modulus of the folded spring, and t is a thickness of the folded spring. Moreover, the anchors 150 are disposed at two opposite sides of the second mass 120, and are fixed on the substrate SUB2. The first interdigitated spring 160 is connected to the second mass 120 and the anchors 150 along the second axial direction A2. In order to clearly present the configuration of the first interdigitated spring 160, FIG. 7C is a partial enlarged view of a region B of the micro-electro mechanical apparatus 100 of FIG. 7A. Referring to FIG. 7A and FIG. 7C, the first interdigitated spring 160 of the present embodiment is connected to the second mass 120 and the anchors 150 along the second axial direction A2 and is located between the second mass 120 and the anchors 150. The first interdigitated spring 160 includes a plurality of first folded portions 160a, a plurality of first connecting portions 160b, a plurality of second folded portions 160c, and a plurality of second connecting portions 160d. The first folded portion 160a includes two first spans 162a and a first head portion H1 connecting the two first spans 162a. The first connecting portion 160b is, for example, composed of two first foot portions F1 and is respectively connected to the first spans 162a of two adjacent first folded portions 160a to define a first space T1. The second folded portion 160c includes two second spans 164c and a second head portion H2 connecting the two second spans 164c. The second connecting portion 160d is, for example, composed of two second foot portions F2, and is respectively connected to the second spans 164c of two adjacent second folded portions 160c to define a second space T2. In the present embodiment, the first space T1 and the second space T2 are, for example, U-shape semi-open spaces. The first folded portion 160a is disposed in the second space T2, and the second folded portion 160c is disposed in the first space T1. It should be noticed that although it is not illustrated in FIG. 7A or FIG. 7C, in the present embodiment, a plurality of the first folded portions 160a can be disposed in the same second space T2 or a plurality of the second folded portions 160c can be disposed in the same first space T1.

In order to mitigate a resonance frequency drift, a width W1 of the first span 162a can be greater than the critical gap (i.e. the aforementioned first gap d1), and a width W2 of the second span 164c is greater than the critical gap (i.e. the aforementioned first gap d1). In other words, under a same fabrication process, the first interdigitated spring 160 with a wider width is used in the present embodiment to mitigate the influence of process variation. Moreover, in order to further mitigate the influence of process variation to further mitigate the resonance frequency drift, the width W1 of the first span 162a can be greater than the "resonance spring width", and the width W2 of the second span 164c can be greater than the "resonance spring width". In addition, the length of the first span 162a and the length of the second span 164c of the first interdigitated spring 160 are close to the side length of the second mass 120, such that the first interdigitated spring 160 can be configured corresponding to the dimension of the second mass 120.

FIG. 7C' is a partial enlarged view of a region B' of the micro-electro mechanical apparatus of FIG. 7A. Referring to FIG. 7A and FIG. 7C', the second interdigitated spring 112 of the present embodiment is connected to the first mass 110 and the second mass 120 along the first axial direction A1 and is located between the first mass 110 and the second mass 120. The second interdigitated spring 112 includes a plurality of third folded portions 112a, a plurality of third connecting portions 112b, a plurality of fourth folded portions 112c, and a plurality of fourth connecting portions 112d. The third folded portion 112a includes two third spans 114a and a third head portion H3 connecting the two third spans 114a. The third connecting portion 112b is, for example, composed of two third foot portions F3 and is respectively connected to the third spans 114a of two adjacent third folded portions 112a to define a third space T3. The fourth folded portion 112c includes two fourth spans 114c and a fourth head portion H4 connecting the two fourth spans 114c. The fourth connecting portion 112d is, for example, composed of two fourth foot portions F4, and is respectively connected to the fourth spans 114c of two adjacent fourth folded portions 112c to define a fourth space T4. In the present embodiment, the third space T3 and the fourth space T4 are, for example, U-shape semi-open spaces. The third folded portion 112a is disposed in the fourth space T4, and the fourth folded portion 112c is disposed in the third space T3. It should be noticed that although it is not illustrated in FIG. 7A or FIG. 7C', in the present embodiment, a plurality of the third folded portions 112a can also be disposed in the same fourth space T4 or a plurality of the fourth folded portions 112c can be disposed in the same third space T3.

Figure 7D:
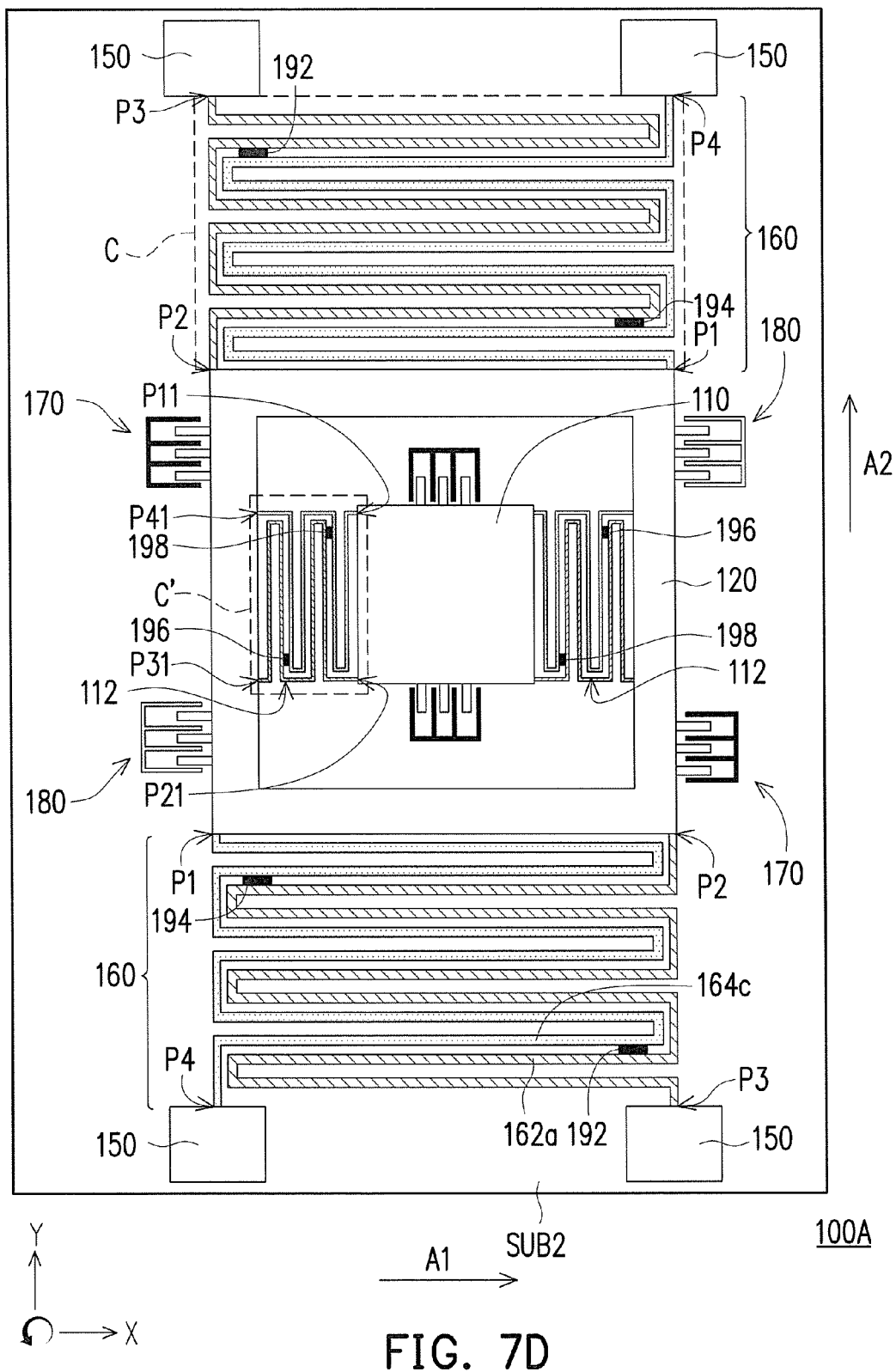
FIG. 7D is a schematic diagram of another micro-electro mechanical apparatus of FIG. 7A.
Figure 7E:
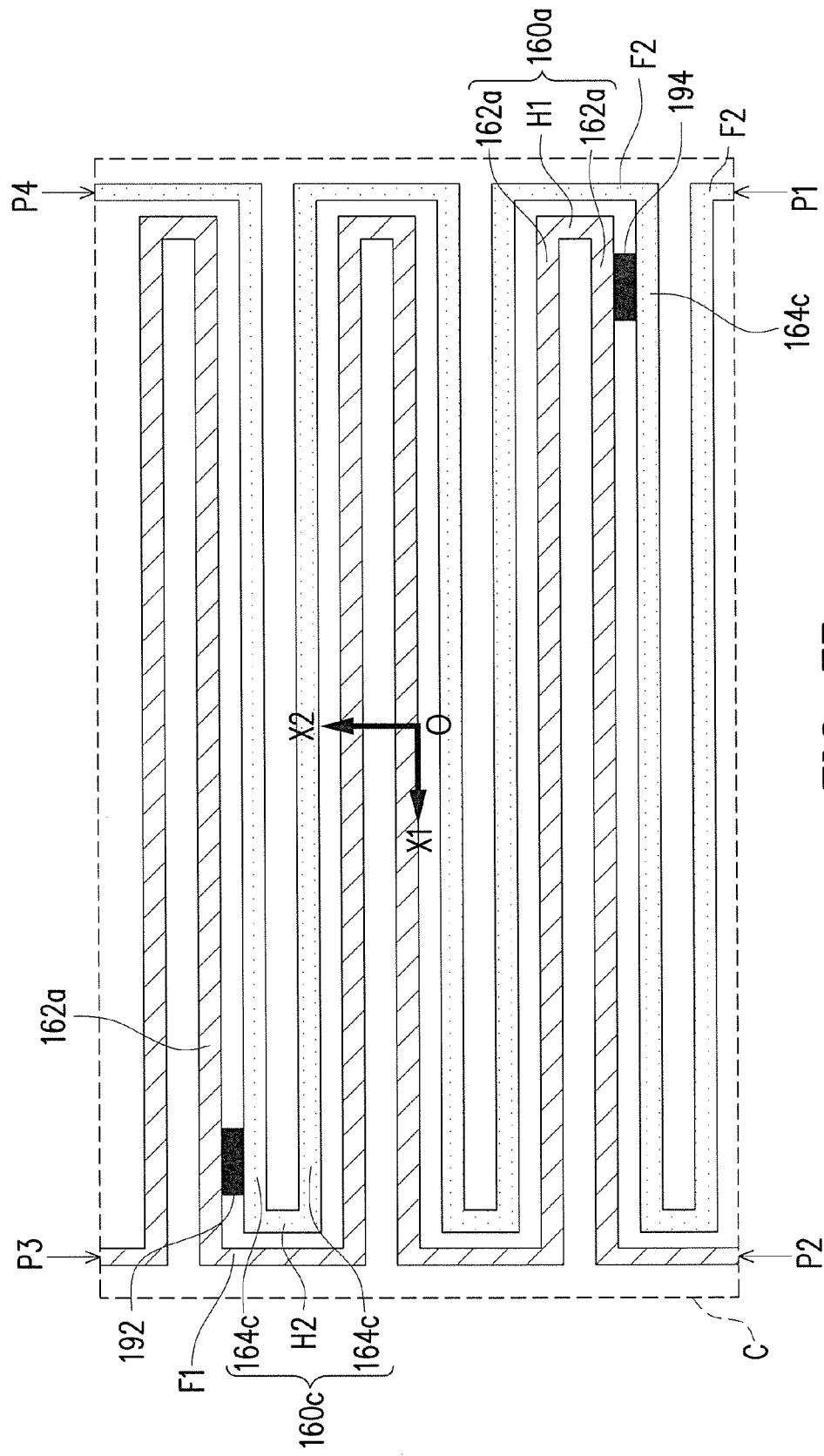
FIG. 7E is a partial enlarged view of a region C of the micro-electro mechanical apparatus of FIG. 7D.
Figure 7E:
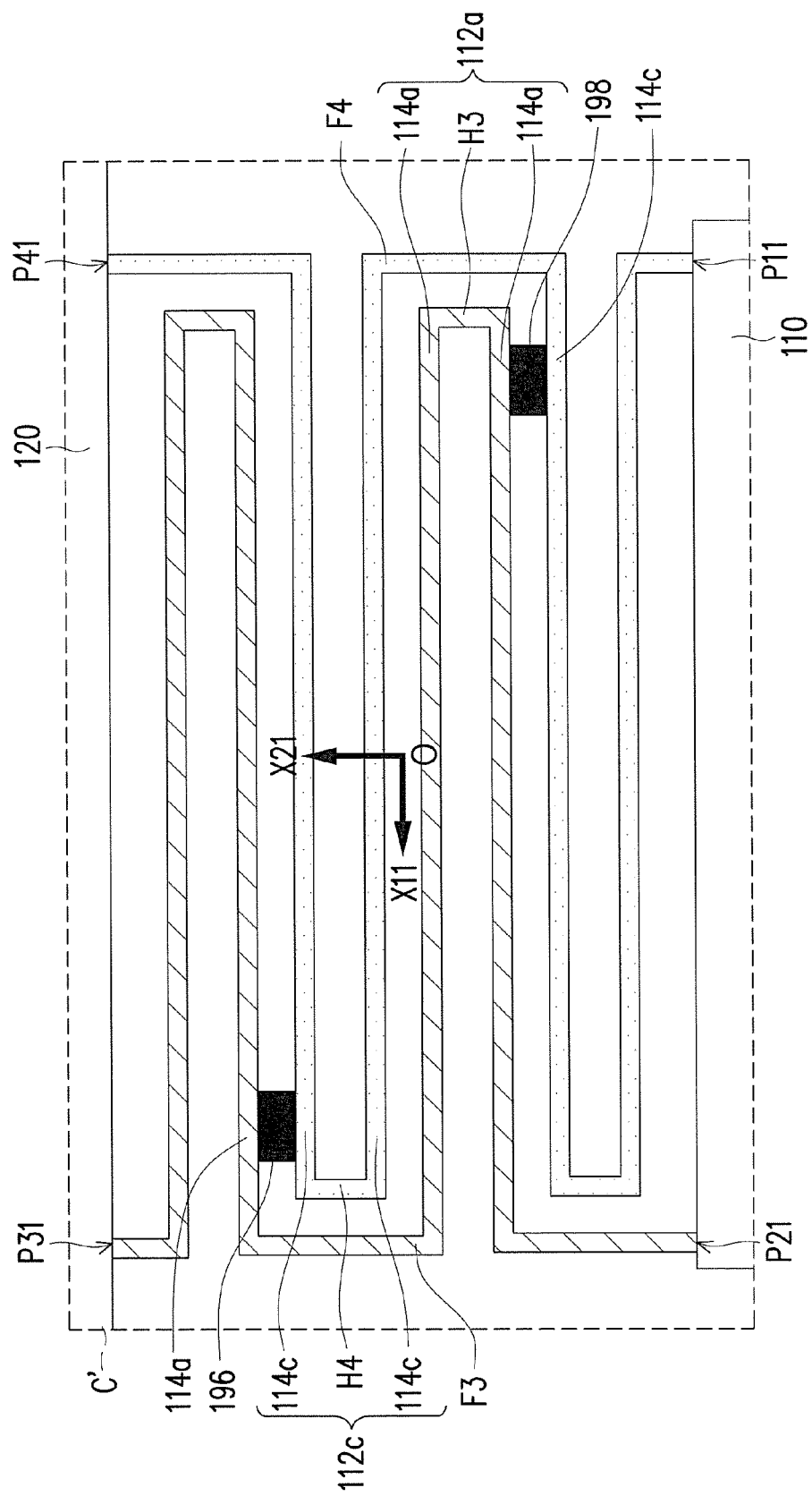

On the other hand, in order to increase stiffness of the interdigitated spring, a bridge can be optionally disposed on the first interdigitated spring. FIG. 7D is a schematic diagram of a micro-electro mechanical apparatus 100A configured with a bridge element. FIG. 7E is a partial enlarged view of a region C of the micro-electro mechanical apparatus 100A of FIG. 7D. FIG. 7E' is a partial enlarged view of a region C' of the micro-electro mechanical apparatus of FIG. 7D. As shown in FIG. 7D and FIG. 7E, the first interdigitated spring 160 is connected to the second mass 120 at positions P1 and P2, and the first interdigitated spring 160 is connected to the anchors 150 at positions P3 and P4. Referring to FIG. 7E, a connecting line (not shown) of the positions P1 and P3 and a connecting line (not shown) of the positions P2 and P4 are intersected at an origin O. The origin O can be an origin of a local coordinate system. A line passing through the original O and being parallel to the first axial direction A1 can be defined as an axial line X1, and a line passing through the original O and perpendicular to the first axial direction A1 can be defined as an axial line X2. As shown in FIG. 7D, a first bridge 192 and a second bridge 194 are used to connect the first span 162a and the second span 164c. Referring to FIG. 7E, in detail, the first bridge 192 connects the portion of the first span 162a which is near the first foot portion F1 and the portion of the second span 164c which is near the second head portion H2. The second bridge 194 connects the portion of the first span 162a which is near the first head portion H1 and the portion of the second span 164c which is near the second foot portion F2. The arrangement of the first bridge 192 and the second bridge 194 can mitigate the influence of the off-axis acceleration on the sensing axis. Moreover, in the present embodiment, as shown in FIG. 7D and FIG. 7E, the first bridge 192 is closer to a side of the anchor 150 and the second bridge 194 is closer to a side of the second mass 120 The first bridge 192 and the second bridge 194 are origin symmetric with respect to the origin O. In other words, if coordinates of the first bridge 192 in the local coordinate system are $(x_1,x_2)$, coordinates of the second bridge 194 in the local coordinate system are $(-x_1,-x_2)$.

Furthermore, as shown in FIG. 7D and FIG. 7E', the second interdigitated spring 112 is connected to the first mass 110 at positions P11 and P21, and the second interdigitated spring 112 is connected to the second mass 120 at positions P31 and P41. Referring to FIG. 7E', a connecting line (not shown) of the positions P11 and P31 and a connecting line (not shown) of the positions P21 and P41 are intersected at an origin O. The origin O can be an origin of a local coordinate system. A line passing through the original O and being parallel to the second axial direction A2 can be defined as an axial line X11, and a line passing through the original O and being perpendicular to the second axial direction A2 can be defined as an axial line X21. As shown in FIG. 7D and FIG. 7E, a third bridge 196 and a fourth bridge 198 are used to connect the third span 114a and the fourth span 114c. Referring to FIG. 7E', in detail, the third bridge 196 connects the portion of the third span 114a which is closer to the third foot portion F3 and the portion of the fourth span 114c which is closer to the fourth head portion H4. The fourth bridge 198 connects the portion of the third span 114a which is closer to the third head portion H3 and the portion of the fourth span 114c which is closer to the fourth foot portion F4. The arrangement of the first bridge 192 and the second bridge 194 can mitigate the influence of the off-axis acceleration on the sensing axis. Moreover, in the present embodiment, as shown in FIG. 7D and FIG. 7E', the third bridge 196 is disposed close to a side of the second mass 120, the fourth bridge 198 is disposed close to a side of the first mass 110, and the third bridge 196 and the fourth bridge 198 are origin symmetric with respect to the origin O. In other words, if coordinates of the third bridge 196 in the local coordinate system are $(x_{11},x_{21})$, coordinates of the fourth bridge 198 in the local coordinate system are $(-x_{11},-x_{21})$.

According to the above descriptions, the micro-electro mechanical apparatus of the present embodiment uses an interdigitated spring with a wider width to maintain sensitivity and mitigate the resonance frequency drift. Moreover, the bridges can be optionally used to decrease the influence of the off-axis acceleration, so as to maintain accuracy.

Second Embodiment

Besides the aforementioned micro-electro mechanical apparatus suitable for sensing angular velocity, the disclosure can also be applied to other types of micro-electro mechanical apparatus. For example, FIG. 8 further illustrates a micro-electro mechanical apparatus adapted to sense acceleration.

Figure 8:
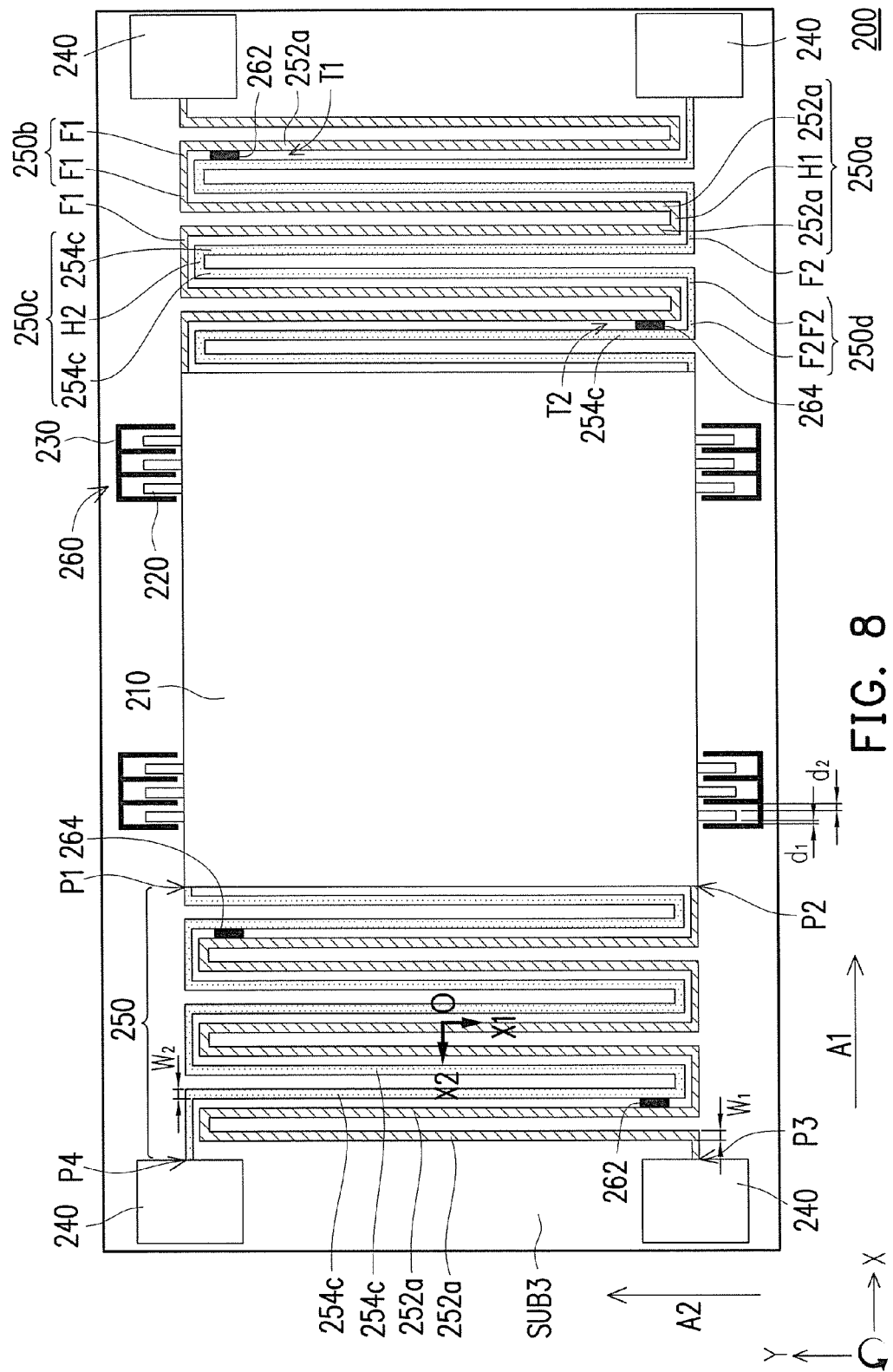
FIG. 8 is a schematic diagram of a micro-electro mechanical apparatus according to a second embodiment of the disclosure.

The micro-electro mechanical apparatus 200 of FIG. 8 includes a substrate SUB3, a first mass 210, movable electrodes 220, stationary electrodes 230, anchors 240 and an interdigitated spring 250. The movable electrodes 220 are disposed on the first mass 210 along the first axial direction A1. The stationary electrodes 230 are disposed on the substrate SUB3 along the first axial direction A1, where the stationary electrode 230 and the movable electrode 220 form a sensing electrode 260. The movable electrode 220 of the sensing electrode 260 and the stationary electrode 230 of the sensing electrode 260 have a critical gap there between, and the critical gap is formed between the movable electrode 220 and the stationary electrode 230 after an etching process. Further, after the movable electrode 220 and the stationary electrode 230 are formed through the etching process and before the first mass 210 is driven, the movable electrode 220 and the stationary electrode 230 have a first gap d1 and a second gap d2 there between. The first gap d1 is not equal to the second gap d2. The critical gap can be defined as a smaller one of the first gap d1 and the second gap d2. In the present embodiment, the first gap d1 can be 2 μm and the second gap d2 can be 5 μm, i.e. the first gap d1 is smaller than the second gap d2. According to such design, the capacitance variation sensed by the sensing electrode 260 may present better linearity. By definition, the critical gap is the first gap d1. In other words, the critical gap between the movable electrode 220 and the stationary electrode 230 is 2 μm.

Moreover, the anchors 240 are disposed at two opposite sides of the first mass 210, and are fixed on the substrate SUB3. The interdigitated spring 250 is connected to the first mass 210 and the anchors 240 along the first axial direction A1, and is located between the first mass 210 and the anchors 240. The interdigitated spring 250 is connected to the first mass 210 at positions P1 and P2, and the interdigitated spring 250 is connected to the anchors 240 at positions P3 and P4. A connecting line (not shown) of the positions P1 and P3 and a connecting line (not shown) of the positions P2 and P4 are intersected at an origin O. The origin O can be an origin of a local coordinate system. As shown in FIG. 8, a line passing through the original O and being parallel to the second axial direction A2 can be defined as an axial line X1, and a line passing through the original O and being perpendicular to the second axial direction A2 can be defined as an axial line X2. The interdigitated spring 250 includes a plurality of first folded portions 250a, a plurality of first connecting portions 250b, a plurality of second folded portions 250c, and a plurality of second connecting portions 250d. The first folded portion 250a includes two first spans 252a and a first head portion H1 connecting the two first spans 252a. The first connecting portion 250b is, for example, composed of two first foot portions F1 and is respectively connected to the first spans 252a of two adjacent first folded portions 250a to define a first space T1. The second connecting portion 250d is, for example, composed of two second foot portions F2, and is respectively connected to second spans 254c of two adjacent second folded portions 250c to define a second space T2. In the present embodiment, the first space T1 and the second space T2 are, for example, U-shape semi-open spaces. The first folded portion 250a is disposed in the second space T2, and the second folded portion 250c is disposed in the first space T1. It should be noticed that although it is not illustrated in FIG. 8, in the present embodiment, a plurality of the first folded portions 250a can also be disposed in the same second space T2 or a plurality of the second folded portions 250c can also be disposed in the same first space T1. In order to mitigate the influence of process variation, a width W1 of the first span 252a can be greater than the critical gap (i.e. the aforementioned first gap d1), and a width W2 of the second span 254c is greater than the critical gap (i.e. the aforementioned first gap d1). Further, under the same fabrication process, by using the interdigitated spring 250 with a wider width, the influence of process variation is decreased, so as to decrease the stiffness variation of the spring. In addition, a length of the first span 252a and the second span 254c is close to a side length of the first mass 210, such that the interdigitated spring 250 can be configured corresponding to a dimension of the first mass 210.

The micro-electro mechanical apparatus 200 of the present embodiment also includes a first bridge 262 and a second bridge 264 for connecting the first span 252a and the second span 254c. Similarly, the first bridge 262 connects the portion of the first span 252a which is near the first foot portion F1 and the portion of the second span 254c which is near the second head portion H2. The second bridge 264 connects the portion of the first span 252a which is near the first head portion H1 and the portion of the second span 254c which is near the second foot portion F2. The arrangement of the first bridge 262 and the second bridge 264 can mitigate the influence of the off-axis acceleration. Moreover, as shown in FIG. 8, in the present embodiment, the first bridge 262 is closer to a side of the anchor 240, the second bridge 264 is closer to a side of the first mass 210, and the first bridge 262 and the second bridge 264 are origin symmetric with respect to the origin O. In other words, if coordinates of the first bridge 262 in the local coordinate system are $(x_3, x_4)$, coordinates of the second bridge 264 in the local coordinate system are $(-x_3, -x_4)$.

According to the above descriptions, the micro-electro mechanical apparatus of the present embodiment also uses the interdigitated spring to maintain sensitivity, and optionally uses the bridges to decrease the influence of the off-axis acceleration to maintain accuracy.

Third Embodiment

Figure 9:
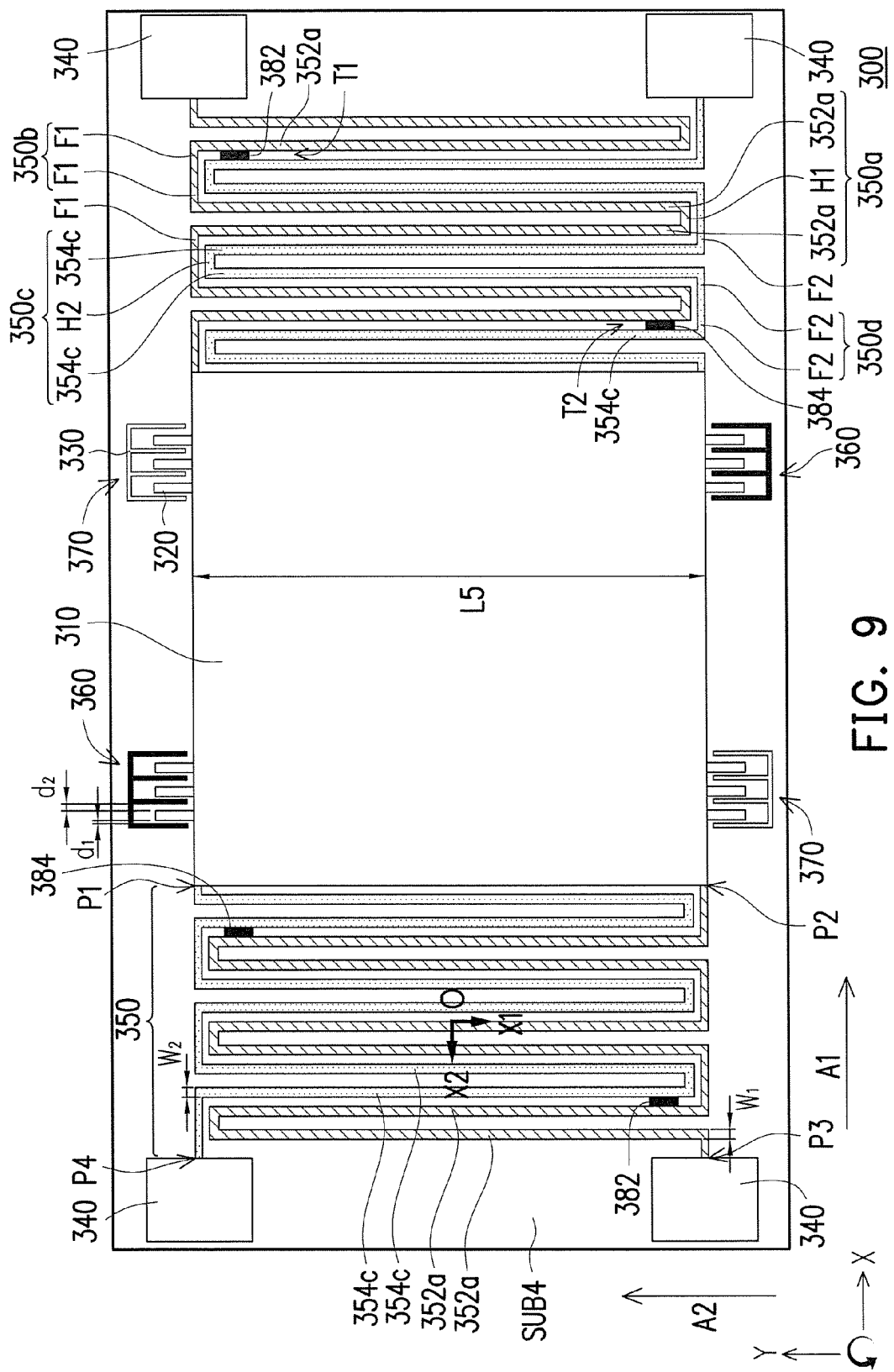
FIG. 9 is a schematic diagram of a micro-electro mechanical apparatus according to a third embodiment of the disclosure.

FIG. 9 illustrates another micro-electro mechanical apparatus using the aforementioned interdigitated spring and bridges. In detail, the micro-electro mechanical apparatus 300 of FIG. 9 is, for example, a micro-electro mechanical resonator, and includes a substrate SUB4, a first mass 310, movable electrodes 320, stationary electrodes 330, anchors 340 and an interdigitated spring 350.

In the present embodiment, the movable electrodes 320 are, for example, disposed on the first mass 310 along the first axial direction A1. The stationary electrodes 330 are, for example, disposed on the substrate SUB4 along the first axial direction A1, where the stationary electrodes 330 and the movable electrodes 320 form a sensing electrode 360 and a driving electrode 370. The movable electrode 320 of the sensing electrode 360 and the stationary electrode 330 of the sensing electrode 360 have a critical gap there between, and the critical gap is formed between the movable electrode 320 and the stationary electrode 330 after an etching process. Further, after the movable electrode 320 and the stationary electrode 330 are formed through the etching process and before the first mass 310 is driven, the movable electrode 320 and the stationary electrode 330 have a first gap d1 and a second gap d2 therebetween. The first gap d1 is not equal to the second gap d2. The critical gap can be defined as a smaller one of the first gap d1 and the second gap d2. In the present embodiment, the first gap d1 can be 2 µm and the second gap d2 can be 4 µm, i.e. the first gap d1 is smaller than the second gap d2. According to such design, the capacitance variation sensed by the sensing electrode 360 may present better linearity. Accordingly, the critical gap is the first gap d1. In other words, the critical gap between the movable electrode 320 and the stationary electrode 330 is 2 µm. Moreover, in the present embodiment, although a folded spring is not adopted, the "resonance spring width" of the folded spring can still be calculated according to the aforementioned equation (3) to serve as a reference for the interdigitated spring. It should be noticed that when the "resonance spring width" of the present embodiment is calculated by the equation (3), f is a resonance frequency of the first mass 310, m is a mass of the first mass 310, L5 is a side length (which is perpendicular to the first axial direction A1) of the first mass 310, L is a length of the folded spring and is equal to one half of the side length of the first mass 310 (i.e. L=L5/2), $n_p$ is a number of the folded springs configured at a same side, $n_s$ is a number of folded portions of each folded spring, E is a Young's modulus of the folded spring, and t is a thickness of the folded spring.

The anchors 340 are disposed at two opposite sides of the first mass 310, and are fixed on the substrate SUB4. The interdigitated spring 350 is, for example, connected to the first mass 310 and the anchors 340 along the first axial direction A1, and is located between the first mass 310 and the anchors 340. The interdigitated spring 350 is connected to the first mass 310 at positions P1 and P2, and the interdigitated spring 350 is connected to the anchors 340 at positions P3 and P4. A connecting line (not shown) of the positions P1 and P3 and a connecting line (not shown) of the positions P2 and P4 are intersected at an origin O. The origin O can be an origin of a local coordinate system. As shown in FIG. 9, a line passing through the original O and being parallel to the second axial direction A2 can be defined as an axial line X1, and a line passing through the original O and being perpendicular to the second axial direction A2 can be defined as an axial line X2. The interdigitated spring 350 includes a plurality of first folded portions 350a, a plurality of first connecting portions 350b, a plurality of second folded portions 350c, and a plurality of second connecting portions 350d. The first folded portion 350a includes two first spans 352a and a first head portion H1 connecting the two first spans 352a. The first connecting portion 350b is, for example, composed of two first foot portions F1 and is respectively connected to the first spans 352a of two adjacent first folded portions 350a to define a first space T1. The second folded portion 350c includes two second spans 354c and a second head portion H2 connecting the two second spans 354c. The second connecting portion 350d is, for example, composed of two second foot portions F2, and is respectively connected to second spans 354c of two adjacent second folded portions 350c to define a second space T2. In the present embodiment, the first space T1 and the second space T2 are, for example, U-shape semi-open spaces. The first folded portion 350a is disposed in the second space T2, and the second folded portion 350c is disposed in the first space T1. It should be noticed that although it is not illustrated in FIG. 9, in the present embodiment, a plurality of the first folded portions 350a can also be disposed in the same second space T2 or a plurality of the second folded portions 350c can be disposed in the same first space T1. Moreover, in order to mitigate the influence of process variation, a width W1 of the first span 352a can be greater than the critical gap (i.e. the aforementioned first gap d1), and a width W2 of the second span 354c is greater than the critical gap (i.e. the aforementioned first gap d1). Further, in order to mitigate the resonance frequency drift, the width W1 of the first span 352a can be greater than the "resonance spring width", and the width W2 of the second span 354c is greater than the "resonance spring width".

On the other hand, a length of the first span 352a and the second span 354c is close to a side length of the first mass 310, such that the interdigitated spring 350 can be configured corresponding to a dimension of the first mass 310.

Moreover, in order to increase the off-axis stiffness of the interdigitated spring 350, the micro-electro mechanical apparatus 300 with interdigitated spring may include a first bridge 382 and a second bridge 384 for connecting the first span 352a and the second span 354c. The first bridge 382 connects the portion of the first span 352a which is near the first foot portion F1 and the portion of the second span 354c which is near the second head portion H2. The second bridge 384 connects the portion of the first span 352a which is near the first head portion H1 and the portion of the second span 354c which is near the second foot portion F2. The arrangement of the first bridge 382 and the second bridge 384 can mitigate the influence of the off-axis acceleration on the sensing axis. Moreover, as shown in FIG. 9, in the present embodiment, the first bridge 382 is closer to a side of the anchor 340, the second bridge 384 is closer to a side of the first mass 310, and the first bridge 382 and the second bridge 384 are origin symmetric with respect to the origin O. In other words, if coordinates of the first bridge 382 in the local coordinate system are $(x_5, x_6)$, coordinates of the second bridge 384 in the local coordinate system are $(-x_5, -x_6)$.

According to the above descriptions, the micro-electro mechanical apparatus of the present embodiment also uses the interdigitated spring to maintain sensitivity and mitigate the resonance frequency drift, and optionally uses the bridges to decrease the influence of the off-axis acceleration.

Fourth Embodiment

Figure 10A:
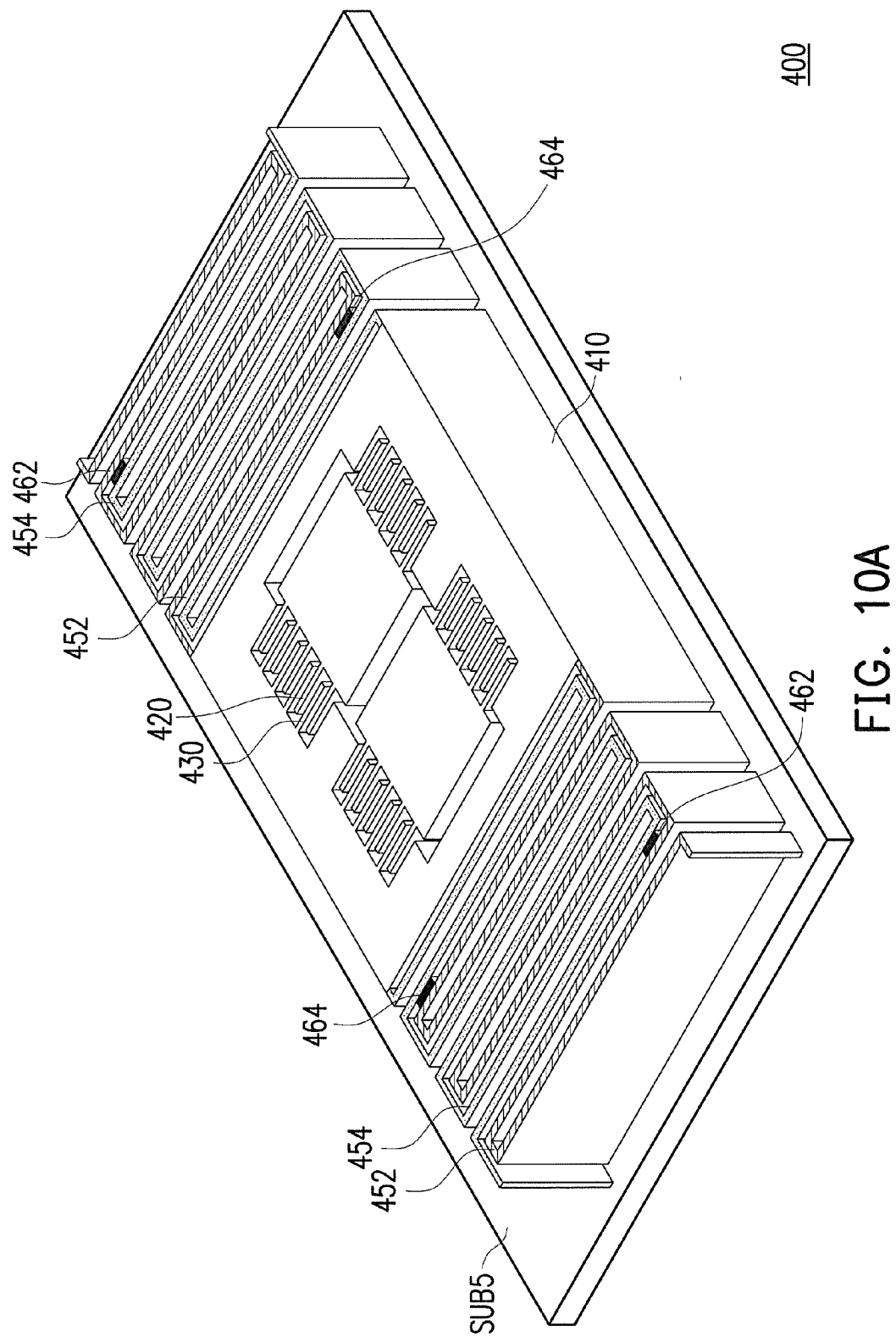
FIG. 10A is an isometric view of a micro-electro mechanical apparatus according to a fourth embodiment of the disclosure.
Figure 10B:
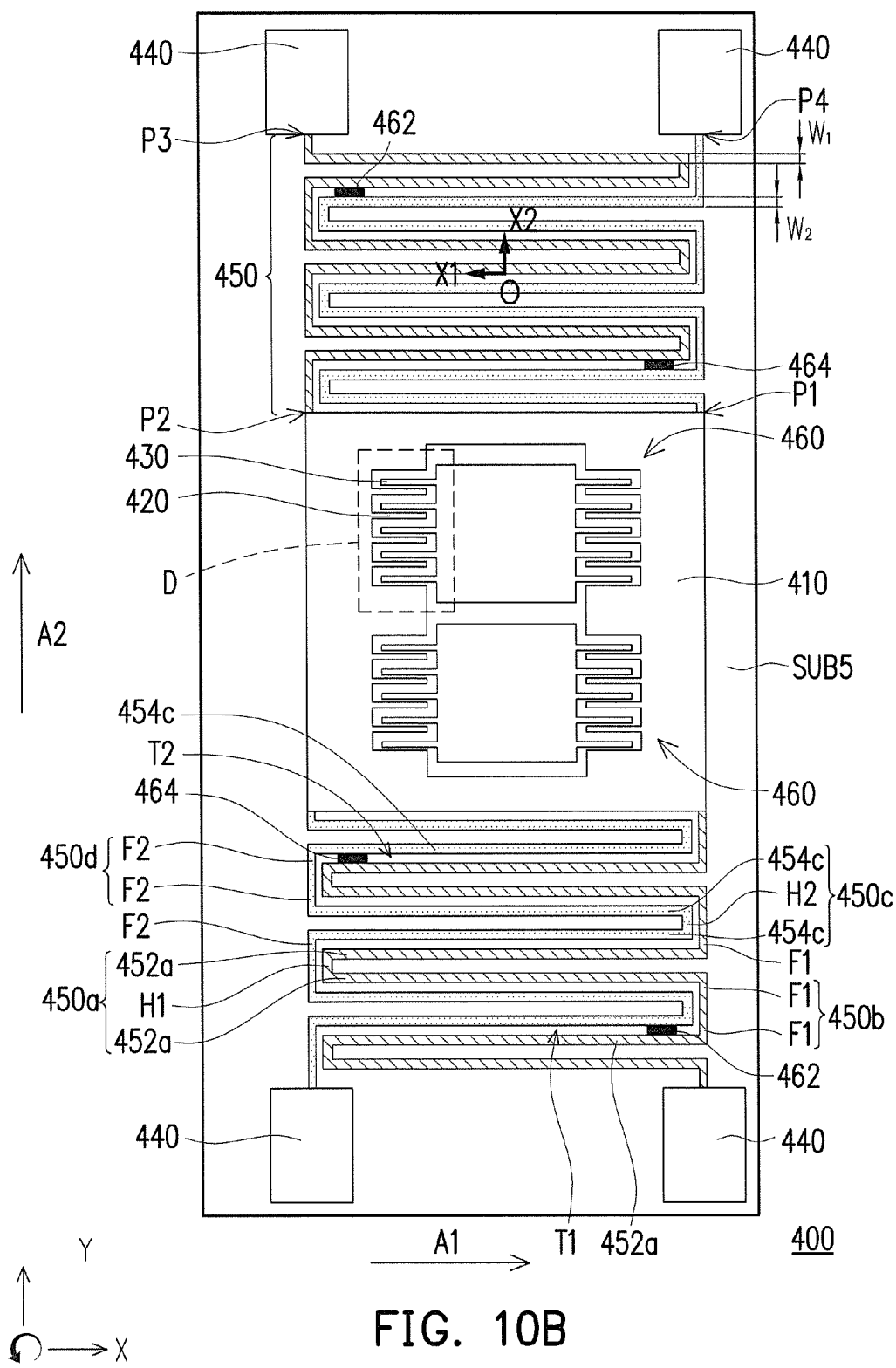
FIG. 10B is a top view of the micro-electro mechanical apparatus of FIG. 10A.
Figure 10C:
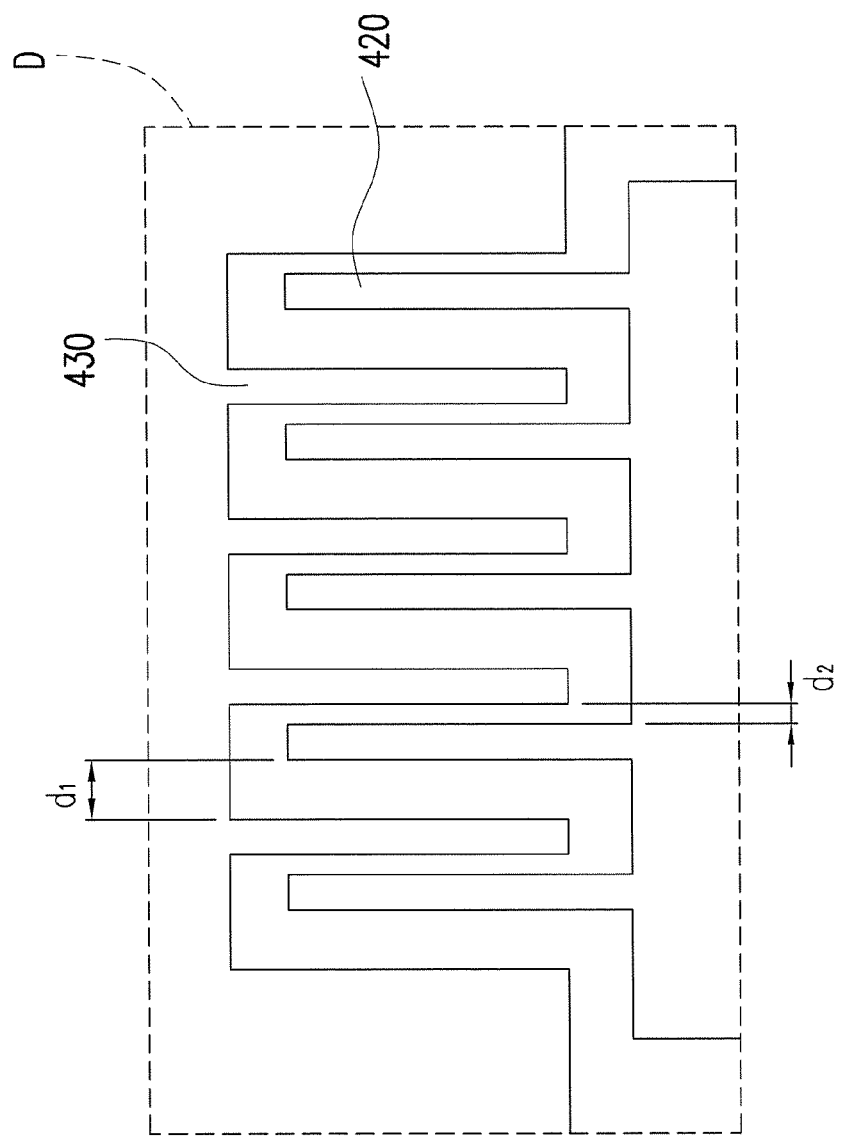
FIG. 10C is a partial enlarged view of a region D of the micro-electro mechanical apparatus of FIG. 10B.

According to a current technique level, the micro-electro mechanical apparatuses are not limited to the structures shown in the aforementioned figures. For example, FIG. 10A-FIG. 10C further illustrate a micro-electro mechanical apparatus applying the interdigitated spring FIG. 10A is an isometric view of a micro-electro mechanical apparatus with interdigitated spring according to the fourth embodiment of the disclosure. FIG. 10B is a top view of the micro-electro mechanical apparatus with interdigitated spring of FIG. 10A. FIG. 10C is an enlarged view of a region D of the micro-electro mechanical apparatus with interdigitated spring of FIG. 10B. Referring to FIG. 10A and FIG. 10B, the micro-electro mechanical apparatus 400 is, for example, an micro-electro mechanical accelerometer which includes a substrate SUB5, a first mass 410, movable electrodes 420, stationary electrodes 430, anchors 440 and an interdigitated spring 450.

The first mass 410, for example, is a frame structure, the movable electrodes 420 are, for example, disposed on the first mass 410 along the second axial direction A2, and the stationary electrodes 430 are, for example, disposed on the substrate SUB5 along the second axial direction A2, where the stationary electrodes 430 and the movable electrodes 420 form a sensing electrode 460. As shown in FIG. 10C, the movable electrode 420 of the sensing electrode 460 and the stationary electrode 430 of the sensing electrode 460 have a critical gap there between, and the critical gap is formed after an etching process. Further, after the movable electrode 420 and the stationary electrode 430 are formed through the etching process, and before the first mass 410 is driven, there exists a first gap d1 and a second gap d2 between the movable electrode 420 and the stationary electrode 430, where the first gap d1 is not equal to the second gap d2. According to such design of unequal gap, the capacitance variation sensed by the sensing electrode 460 may present better linearity. The critical gap can be defined as a smaller one of the first gap d1 and the second gap d2. In the present embodiment, the first gap d1 can be 4 μm and the second gap d2 can be 2 μm. By definition, the critical gap is the second gap d2. In other words, the critical gap between the movable electrode 420 and the stationary electrode 430 is 2 μm in the present embodiment.

Moreover, the anchors 440 are disposed at two opposite sides of the first mass 410, and are fixed on the substrate SUB5. The interdigitated spring 450 is, for example, connected to the first mass 410 and the anchors 440 along the second axial direction A2, and is located between the first mass 410 and the anchors 440. The interdigitated spring 450 is connected to the first mass 410 at positions P1 and P2, and the interdigitated spring 450 is connected to the anchors 440 at positions P3 and P4. A connecting line (not shown) of the positions P1 and P3 and a connecting line (not shown) of the positions P2 and P4 are intersected at an origin O. The origin O can be an origin of a local coordinate system. As shown in FIG. 10B, a line passing through the original O and being parallel to the first axial direction A1 can be defined as an axial line X1, and a line passing through the original O and being perpendicular to the first axial direction A1 can be defined as an axial line X2. The interdigitated spring 450 includes a plurality of first folded portions 450a, a plurality of first connecting portions 450b, a plurality of second folded portions 450c, and a plurality of second connecting portions 450d. The first folded portion 450a includes two first spans 452a and a first head portion H1 connecting the two first spans 452a. The first connecting portion 450b is, for example, composed of two first foot portions F1 and is respectively connected to the first spans 452a of two adjacent first folded portions 450a to define a first space T1. The second folded portion 450c includes two second spans 454c and a second head portion H2 connecting the two second spans 454c. The second connecting portion 450d is, for example, composed of two second foot portions F2, and is respectively connected to second spans 454c of two adjacent second folded portions 450c to define a second space T2. In the present embodiment, the first space T1 and the second space T2 are, for example, U-shape spaces. The first folded portion 450a is disposed in the second space T2, and the second folded portion 450c is disposed in the first space T1. It should be noticed that although it is not illustrated in FIG. 10B, in the present embodiment, a plurality of the first folded portions 450a can also be s disposed in the same second space T2 or a plurality of the second folded portions 450c can be also disposed in the same first space T1. Moreover, the width W1 of the first span 452a is greater than the critical gap (i.e. the aforementioned second gap d2), and a width W2 of the second span 454c is also greater than the critical gap. Further, under the same fabrication process, by using the interdigitated spring 450 with wider width, the influence of processor variation can be mitigated. In addition, a length of the first span 452a and the second span 454c is substantially equal to a side length of the first mass 410, such that the interdigitated spring 450 can be configured corresponding to a dimension of the first mass 410.

Moreover, the micro-electro mechanical apparatus 400 of the present embodiment may also include a first bridge 462 and a second bridge 464 for connecting the first span 452a and the second span 454c. Similarly, the first bridge 462 connects the portion of the first span 452a which is near the first foot portion F1 and the portion of the second span 454c which is near the second head portion H2. The second bridge 464 connects the portion of the first span 452a which is near the first head portion H1 and the portion of the second span 454c which is near the second foot portion F2. The arrangement of the first bridge 462 and the second bridge 464 can mitigate the influence of the off-axis acceleration on the sensing axis. Moreover, as shown in FIG. 10B, in the present embodiment, the first bridge 462 is closer to a side of the anchor 440, the second bridge 464 is closer to a side of the first mass 410, and the first bridge 462 and the second bridge 464 are origin symmetric with respect to the origin O. In other words, if coordinates of the first bridge 462 in the local coordinate system are $(x_7, x_8)$, then the coordinates of the second bridge 464 in the local coordinate system are $(-x_7, -x_8)$.

According to the above descriptions, the micro-electro mechanical apparatus of the present embodiment also uses the interdigitated spring and optionally uses the bridges to decrease the influence of the off-axis acceleration.

Fifth Embodiment

Figure 11A:
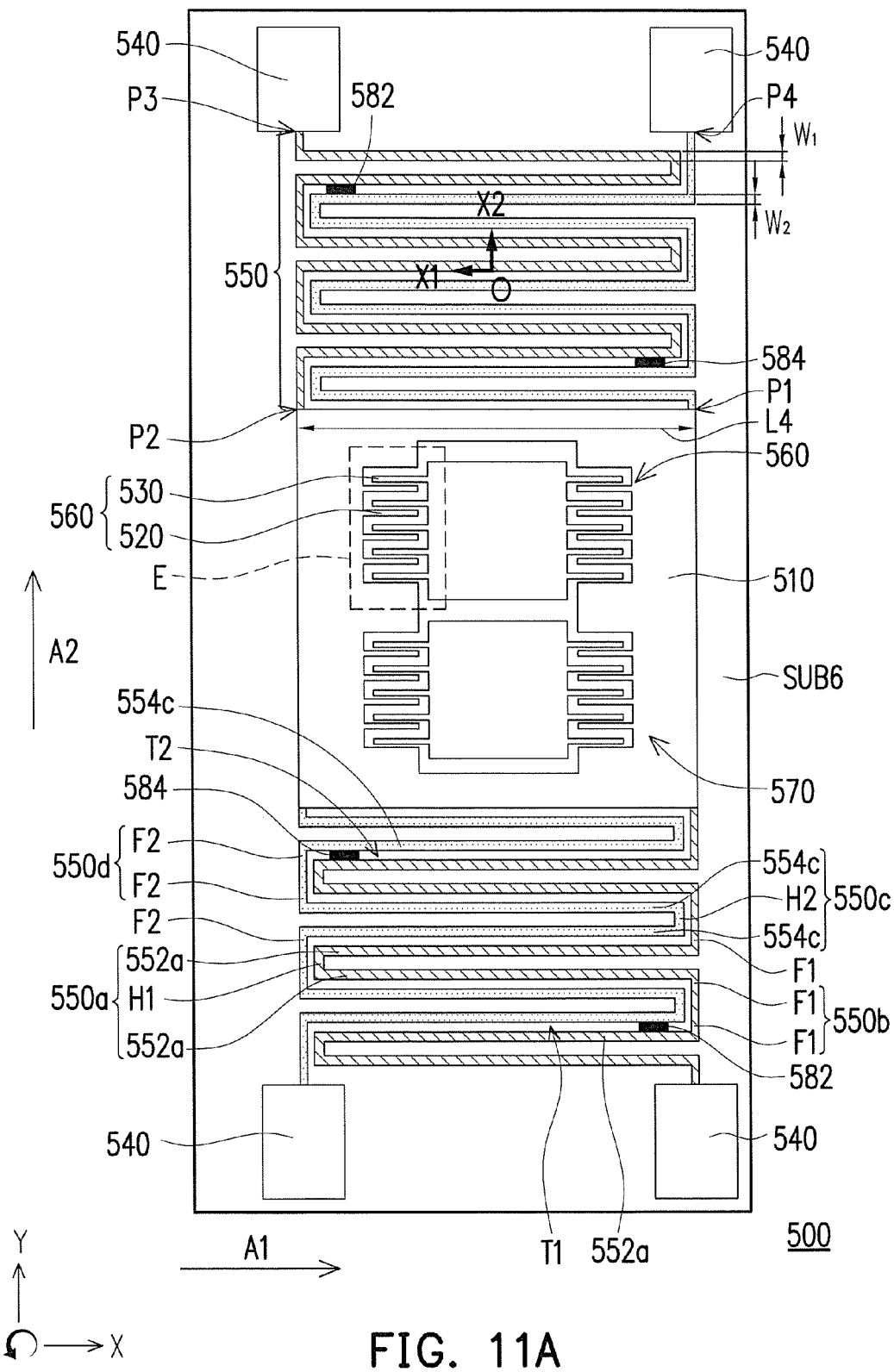
FIG. 11A is a schematic diagram of a micro-electro mechanical apparatus according to a fifth embodiment of the disclosure.

FIG. 11A further illustrates another micro-electro mechanical apparatus applying the interdigitated spring of the disclosure. In detail, the micro-electro mechanical apparatus 500 of FIG. 11A is, for example, a micro-electro mechanical resonator which includes a substrate SUB6, a first mass 510, movable electrodes 520, stationary electrodes 530, anchors 540 and an interdigitated spring 550.

In the present embodiment, the first mass 510, for example, is a frame structure, the movable electrodes 520 are, for example, disposed on the first mass 510 along the second axial direction A2, and the stationary electrodes 530 are, for example, disposed on the substrate SUB6 along the second axial direction A2, where the stationary electrodes 530 and the movable electrodes 520 form a sensing electrode 560 and a driving electrode 570 in the first mass 510.

Figure 11B:
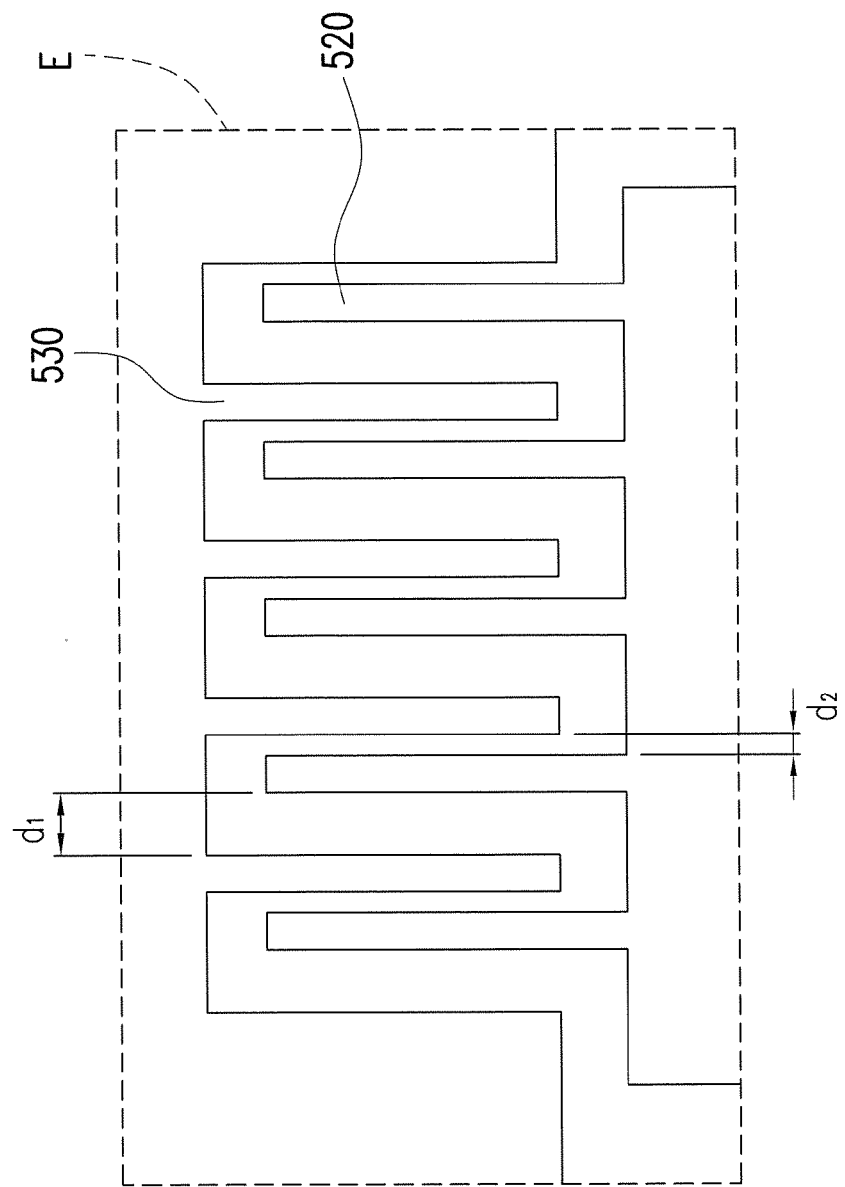
FIG. 11B is a partial enlarged view of a region E of the micro-electro mechanical apparatus of FIG. 11A.

FIG. 11B is a partial enlarged view of a region E of the micro-electro mechanical apparatus of FIG. 11A. Referring to FIG. 11B, the movable electrode 520 of the sensing electrode 560 and the stationary electrode 530 of the sensing electrode 560 have a critical gap there between, and the critical gap is formed after an etching process. Further, after the movable electrode 520 and the stationary electrode 530 are formed through the etching process and before the first mass 510 is driven, there exist first gap d1 and a second gap d2 there between, where the first gap d1 is not equal to the second gap d2. According to such design of unequal gap, the capacitance variation sensed by the sensing electrode 560 may present better linearity. The critical gap is defined as a smaller one of the first gap d1 and the second gap d2. In the present embodiment, the first gap d1 can be 2 µm and the second gap d2 can be 1.5 µm. Hence, the critical gap is the second gap d2. In other words, the critical gap between the movable electrode 520 and the stationary electrode 530 is 1.5 µm. Moreover, in the present embodiment, although a folded spring is not adopted, the "resonance spring width" of the folded spring can still be calculated according to the aforementioned equation (3) to serve as a reference for designing the interdigitated spring. It should be noticed that when the "resonance spring width" of the present embodiment is calculated by the equation (3), f is a resonance frequency of the first mass 510, m is a mass of the first mass 510, L4 is a side length (which is perpendicular to the second axial direction A2) of the first mass 510, L is a length of the folded spring which is equal to a half of the side length of the first mass 510 (i.e. L=L4/2), $n_p$ is a number of the folded springs configured at a same side, $n_s$ is a number of folded portions of a single folded spring, E is a Young's modulus of the folded spring, and t is a thickness of the folded spring.

Referring to FIG. 11A, the anchors 540 are disposed at two opposite sides of the first mass 510, and are fixed on the substrate SUB6. The interdigitated spring 550 is, for example, connected to the first mass 510 and the anchors 540 along the second axial direction A2, and is located between the first mass 510 and the anchors 540. The interdigitated spring 550 is connected to the first mass 510 at positions P1 and P2, and the interdigitated spring 550 is connected to the anchors 540 at positions P3 and P4. A connecting line (not shown) of the positions P1 and P3 and a connecting line (not shown) of the positions P2 and P4 are intersected at an origin O. The origin O can be an origin of a local coordinate system. As shown in FIG. 11A, a line passing through the original O and being parallel to the first axial direction A1 can be defined as an axial line X1, and a line passing through the original O and being perpendicular to the first axial direction A1 can be defined as an axial line X2. The interdigitated spring 550 includes a plurality of first folded portions 550a, a plurality of first connecting portions 550b, a plurality of second folded portions 550c, and a plurality of second connecting portions 550d. The first folded portion 550a includes two first spans 552a and a first head portion H1 connecting the two first spans 552a. The first connecting portion 550b is, for example, composed of two first foot portions F1 and is respectively connected to the first spans 552a of two adjacent first folded portions 550a to define a first space T1. The second folded portion 550c includes two second spans 554c and a second head portion H2 connecting the two second spans 554c. The second connecting portion 550d is, for example, composed of two second foot portions F2, and is respectively connected to second spans 554c of two adjacent second folded portions 550c to define a second space T2. In the present embodiment, the first space T1 and the second space T2 are, for example, U-shape spaces. The first folded portion 550a is disposed in the second space T2, and the second folded portion 550c is disposed in the first space T1. It should be noticed that although it is not illustrated in FIG. 11A, in the present embodiment, a plurality of the first folded portions 550a can also be disposed in the same second space T2 or a plurality of the second folded portions 550c can also be disposed in the same first space T1. Moreover, a width W1 of the first span 552a is greater than the critical gap (i.e. the aforementioned second gap d2), and a width W2 of the second span 554c is greater than the critical gap (i.e. the aforementioned second gap d2). Further, under the same fabrication process, by using the interdigitated spring 550 with wider width, the influence of processor variation can be mitigated. In order to further mitigate the resonance frequency drift, the width W1 of the first span 552a can be greater than the "resonance spring width" and the width W2 of the second span 554c is also greater than the "resonance spring width".

On the other hand, a length of the first span 552a and the second span 554c is substantially equal to a side length of the first mass 510, such that the interdigitated spring 550 can be configured corresponding to a dimension of the first mass 510.

Moreover, in order to increase the off-axis stiffness of the interdigitated spring 550, the micro-electro mechanical apparatus 500 with interdigitated spring may include a first bridge 582 and a second bridge 584 for connecting the first span 552a and the second span 554c. The first bridge 582 connects the portion of the first span 552a which is near the first foot portion F1 and the portion of the second span 354c which is near the second head portion H2. The second bridge 584 connects the portion of the first span 552a which is near the first head portion H1 and the portion of the second span 554c which is near the second foot portion F2. The arrangement of the first bridge 582 and the second bridge 584 can mitigate the influence of the off-axis acceleration on the sensing axis. Moreover, as shown in FIG. 11A, in the present embodiment, the first bridge 582 is closer to a side of the anchor 540, the second bridge 584 is closer to a side of the first mass 510, and the first bridge 582 and the second bridge 584 are origin symmetric with respect to the origin O. In other words, if coordinates of the first bridge 582 in the local coordinate system are $(x_9, x_{10})$, coordinates of the second bridge 584 in the local coordinate system are $(-x_9, -x_{10})$. According to the above descriptions, the micro-electro mechanical resonator of the present embodiment also uses the interdigitated spring to maintain sensitivity and mitigate the resonance frequency drift, and optionally uses the bridges to decrease the influence of the off-axis acceleration to maintain accuracy.

According to the aforementioned embodiments, the method of mitigating the frequency drift of the micro-electro mechanical apparatus is disclosed. The method uses an interdigitated spring to connect at least one mass and an anchor of the micro-electro mechanical apparatus. The interdigitated spring includes a plurality of first folded portions, a plurality of first connecting portions, a plurality of second folded portions, and a plurality of second connecting portions. Each of the first folded portions includes two first spans and a first head portion connecting the two first spans. The first connecting portion is respectively connected to the first spans of two adjacent first folded portions to define a first space. Each of the second folded portions includes two second spans and a second head portion connecting the two second spans. The second connecting portion is respectively connected to the second spans of two adjacent second folded portions to define a second space, where at least one first folded portion is disposed in the second space, and at least one second folded portion is disposed in the first space. Moreover, the width of the first span and the width of the second span are greater than a critical gap disposed between a movable electrode and a stationary electrode of the micro-electro mechanical apparatus. Therefore, in the same fabrication process, the influence of process variation can be mitigated by using the interdigitated spring with a wider width. In order to further mitigate the resonance frequency drift phenomenon, the width of the first span is greater than the "resonance spring width" and the width of the second span is greater than the "resonance spring width".

Moreover, in the method of mitigating the frequency drift of the micro-electro mechanical apparatus of the disclosure, at least one bridge can be optionally configured, to connect the first span and the second span for maintaining the accuracy. For example, the bridge includes a first bridge where the first bridge connects the portion of the first span which is near the first connecting portion and the portion of the second span which is near the second head portion. The bridge further includes a second bridge, where the second bridge connects the portion of the first span which is near the first head portion and the portion of the second span which is near the second connecting portion. By this way, the effect of the off-axis acceleration on the interdigitated spring can be decreased. Moreover, the first bridge can be disposed at a side close to the anchor and the second bridge can be disposed closely to the first mass such that the first bridge and the second bridge is origin symmetric with respect to the origin.

Figure 12A:
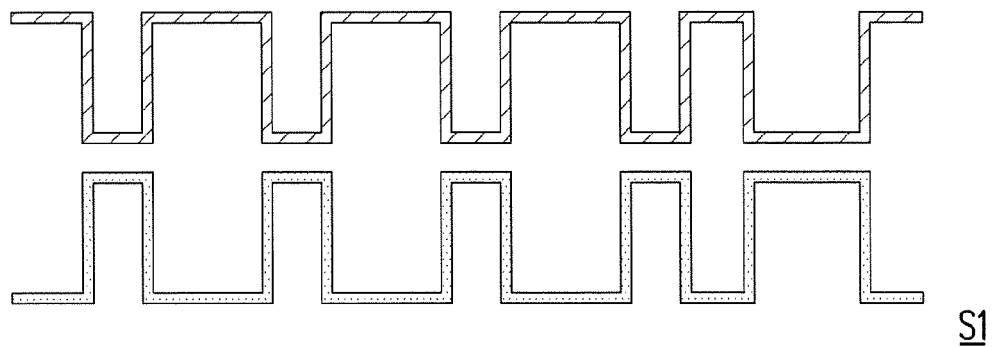
FIGS. 12A-12C are schematic diagrams of interdigitated springs with different configurations.
Figure 12B:
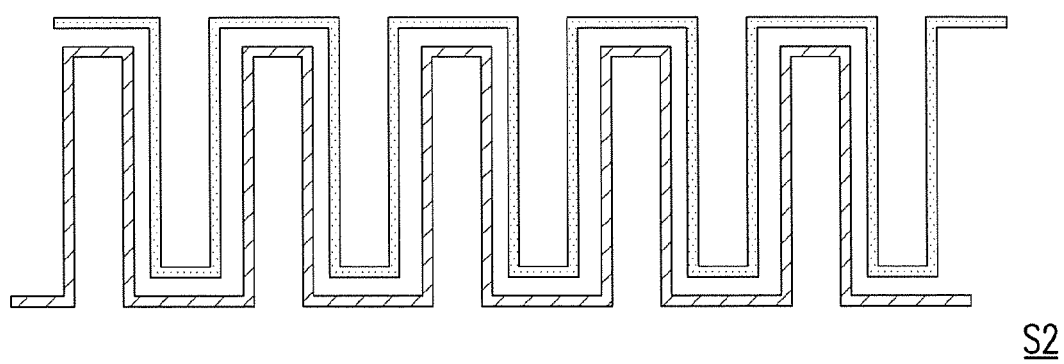
Figure 12C:
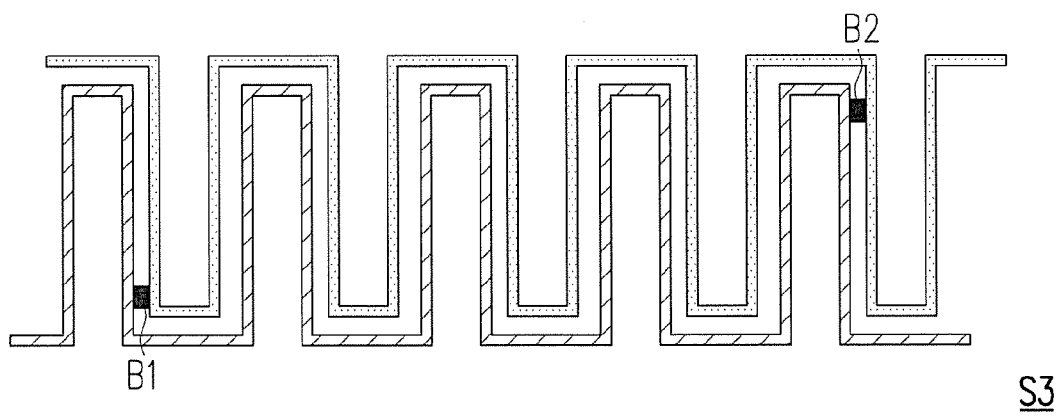
Figure 13:
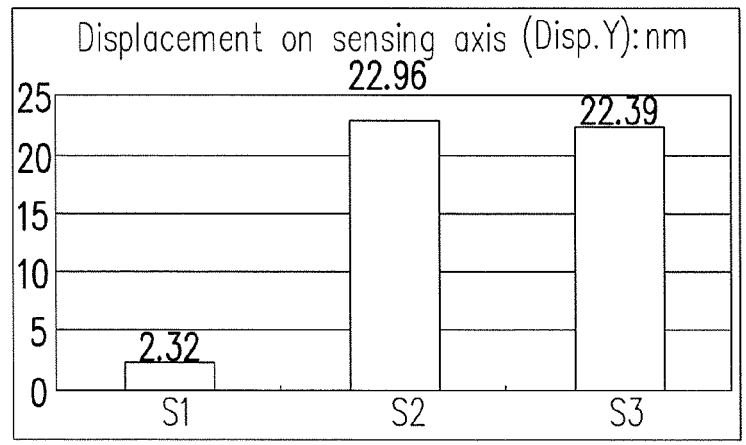
FIG. 13 illustrates displacement simulation results of springs S1-S3 of FIGS. 12A-12C subjected to an acceleration along a sensing axis (Y-axis).

In the disclosure, effects of the interdigitated spring and the bridges are further verified. FIG. 13 illustrates simulation results of displacements for three micro-electro mechanical accelerometers of FIG. 10A with springs S1, S2, and S3 of FIGS. 12A-12C respectively. The three micro-electro mechanical accelerometers are subjected to an acceleration along the sensing axis. Further, the simulation applies the finite element method (FEM) to construct three finite element models according to the geometry of the micro-electro mechanical accelerometer of FIG. 10A. The three finite element models have spring S1, spring S2 and spring S3 respectively (shown in FIGS. 12A, 12B, and 12C). Regarding each of the finite element models, the boundary conditions are applied to restrain the end of each spring in 6-D.O.F. Then an acceleration of 1 g is respectively applied on the three finite element models along the Y-axis. The simulation results of displacement for three finite element model are shown in FIG. 13, and the displacements are 2.32 nm, 22.96 nm and 22.39 nm respectively. It can be found that under the same loading condition, the displacement of the finite element model with interdigitated spring S2 on the sensing axis (the Y-axis) is much greater than the displacement of finite element model with the interdigitated spring S1. According to the simulation results, it implies that the sensing sensitivity (on the sensing axis) of the micro-electro mechanical accelerometer with interdigitated spring S2 is superior to that of the micro-electro mechanical accelerometer with interdigitated spring S1. Moreover, the similar simulation result of the displacement for micro-electro mechanical accelerometer with the interdigitated spring S3 (shown in FIG. 12C) is closer to that for the micro-electro mechanical accelerometer with interdigitated spring S2 (shown in FIG. 12B). In other words, the bridges B1 and B2 do not affect the displacement (along the sensing axis) of the micro-electro mechanical accelerometer with interdigitated spring S3 significantly.

Figure 14:
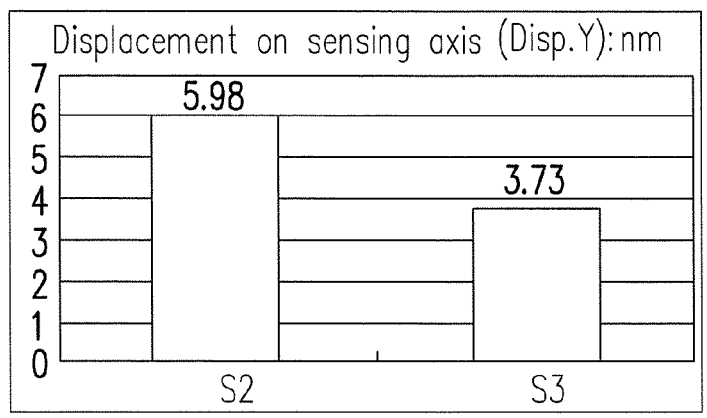
FIG. 14 and FIG. 15 respectively illustrate displacement simulation results of displacement (along the sensing axis) for the spring of FIG. 12B and the spring of FIG. 12C when the springs are subjected to an acceleration of 1 g along other axial directions (an X-axis and a Z-axis) and none acceleration exists on the sensing axis (the Y-axis).
Figure 15:
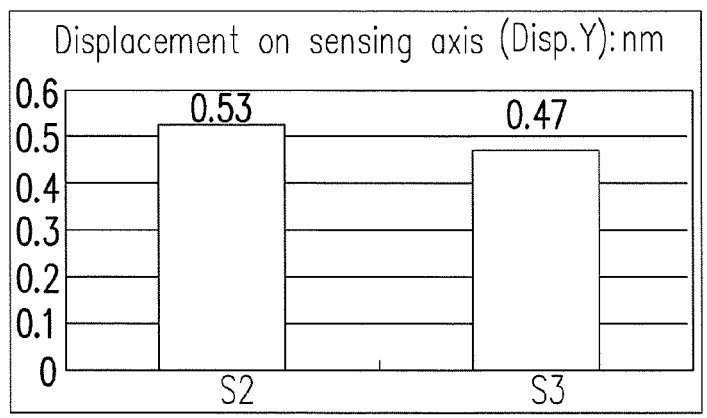

Moreover, FIG. 14 illustrates simulation results of displacement (along the sensing axis) for a micro-electro mechanical accelerometer with the interdigitated spring S2 and that for a micro-electro mechanical accelerometer with the interdigitated spring S3 when an acceleration of 1 g along the X-axis is applied and no acceleration is applied on the sensing axis (the Y-axis). FIG. 15 illustrates displacement (along the sensing axis) from the simulation results of the micro-electro mechanical accelerometer with the interdigitated spring S2 and that of the micro-electro mechanical accelerometer with the interdigitated spring S3 when an acceleration of 1 g along the Z-axis is applied and no acceleration is applied on the sensing axis. According to FIG. 14 and FIG. 15, it is known that when the micro-electro mechanical accelerometer with the interdigitated spring S3 having the bridges B1 and B2 is subjected to the acceleration along the off-axis (the X-axis or the Z-axis), and the displacement thereof generated on the sensing axis is smaller than that of the micro-electro mechanical accelerometer with spring S2 (having no the bridge). Therefore, by using the bridge B1 and B2, the influence from off-axis acceleration on the sensing axis can be decreased. Hence, the accuracy is improved.

Moreover, locations of the bridges on the interdigitated spring are not limited by the disclosure. The effects of the bridges on different locations are further studied. The simulations for micro-electro mechanical accelerometer with different interdigitated springs R1-R5 (as shown in FIGS. 16A-16E) are implemented to evaluate the displacements of the micro-electro mechanical accelerometers with interdigitated springs R1-R5 under the off-axis acceleration. The boundary condition is applied to restrain end of each spring in 6-D.O.F. The acceleration of 1 g is respectively applied on each model of the micro-electro mechanical accelerometer with the different interdigitated springs R1-R5. And the displacements of the interdigitated springs R1-R5 are respectively obtained from the simulation results and these displacements are shown in the following table (Table one).

TABLE one

| | R1 | R2 | R3 | R4 | R5 |
|---|---|---|---|---|---|
| Yg | 22.96 nm | 20.72 nm | 22.39 nm | 22.61 nm | 22.58 nm |
| Xg | 5.98 nm | 4.99 nm | 3.73 nm | 4.69 nm | 4.76 nm |
| Zg | 0.535 nm | 0.447 nm | 0.476 nm | 0.51 nm | 0.502 nm |

In the table one, Yg represents an acceleration of 1 g being applied on the micro-electro mechanical accelerometer with an interdigitated spring along the Y-axis. Data corresponding to Yg at a second row of Table one represents a displacement of the micro-electro mechanical accelerometer along the sensing axis (the Y-axis). Similarly, Xg represents an acceleration of 1 g being applied on the micro-electro mechanical accelerometer along the X-axis. Data corresponding to Xg at a third row of the table one represents a displacement of the micro-electro mechanical accelerometer with interdigitated spring along the sensing axis (the Y-axis), where such displacement is the displacement influenced by the off-axis acceleration (Xg). Similarly, Zg represents an acceleration of 1 g being applied on the micro-electro mechanical accelerometer with an interdigitated spring along the Z-axis. Data corresponding to Xg at a fourth row of the table one represents the displacement of the micro-electro mechanical accelerometer with interdigitated spring along the sensing axis (the Y-axis), where such displacement is the displacement influenced by the off-axis acceleration (Zg).

Figure 16A:
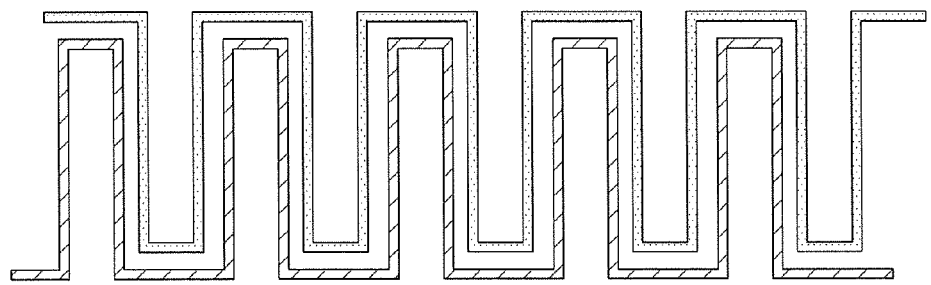
FIGS. 16A-16E are schematic diagrams of different interdigitated springs.
Figure 16B:
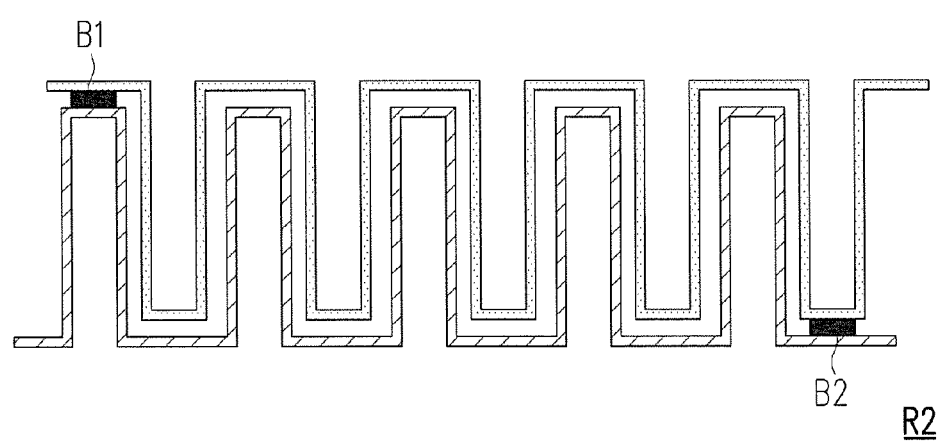
Figure 16C:
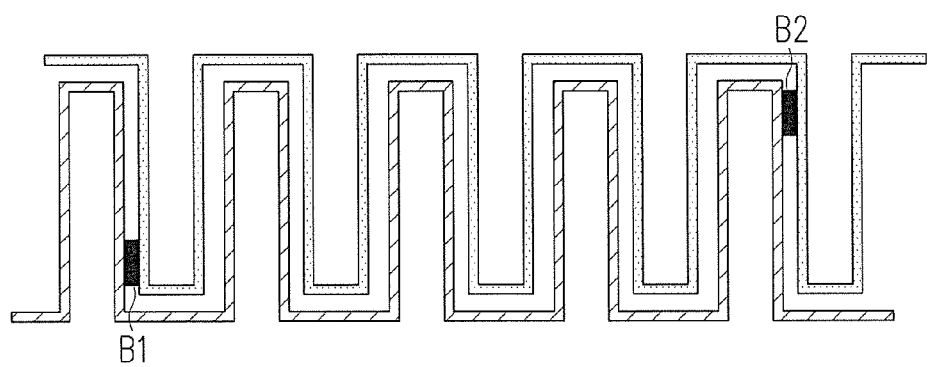
Figure 16D:
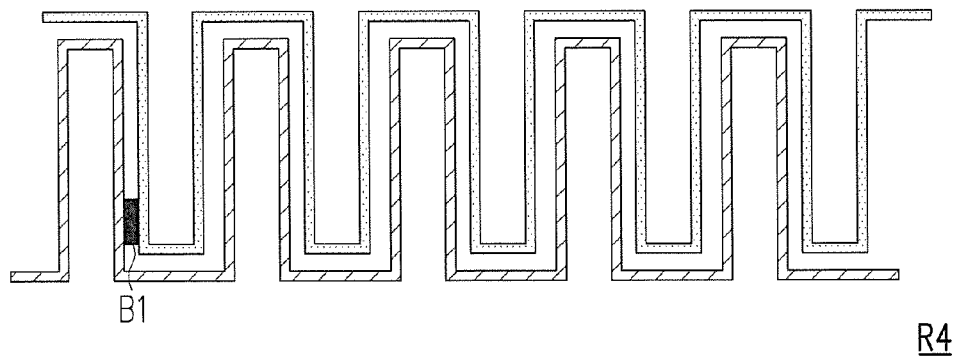
Figure 16E:
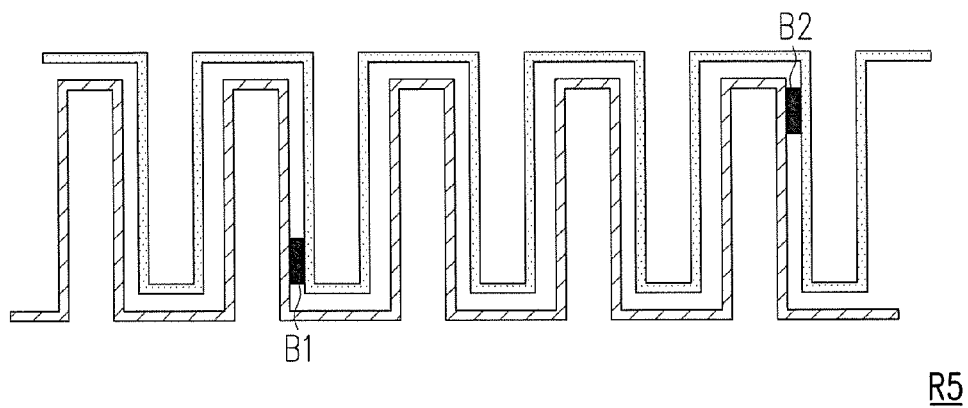

According to the simulation results, it is known that the configuration of the bridges B1 and B2 in FIG. 16C may produce an effective displacement along the sensing axis (the Y-axis) when the on-axis acceleration is applied, and a smaller displacement is generated along the sensing axis when the off-axis acceleration is generated. By using the bridge B1 and B2 of the interdigitated spring R3 (shown in FIG. 16C), the displacement of 3 the micro-electro mechanical accelerometer on the sensing axis is effected insignificantly and the stiffness of the interdigitated spring S3 along the other axial directions (the X-axis and the Z-axis) can be improved to decrease the influence of the off-axis acceleration.

Moreover, in the disclosure, the effect of decreasing resonance frequency by the interdigitated spring is further verified by simulation. The simulation and analysis is performed on a micro-electro mechanical resonator with a resonance frequency designed to about 11,000 Hz (shown in FIG. 11A). Two finite element models are constructed according to the geometry of the micro-electro mechanical resonator of FIG. 11A. The two finite element models have springs S1 and S2 (shown in FIGS. 12A and 12B) respectively. It should be noted that there are no bridges B1 and B2 in the finite element model. For each finite element model, a boundary condition is applied to restrain an end of each spring in 6-D.O.F.

In order to achieve the resonance frequency of about 11,000 Hz, the micro-electro mechanical resonator with the S1-type spring (a conventional spring) is required to adopt a spring width of 1.9 μm. Comparatively, the micro-electro mechanical resonator with the S2-type spring (the interdigitated spring) can adopt a spring width of 4.0 μm to achieve the resonance frequency of about 11,000 Hz. Obviously, in order to satisfy the design requirement of the resonance frequency of about 11,000 Hz, the micro-electro mechanical resonator with the S2-type spring can adopt a spring with a wider width.

Under the assumption that the fabrication process has a width variation of 0.2 μm, a simulation result of the resonance frequency drift of the micro-electro mechanical resonator with the S1-type spring (the conventional spring) is shown in Table two. A simulation result of the resonance frequency drift of the micro-electro mechanical resonator with the S2-type spring (the interdigitated spring) is shown in Table three.

TABLE two

| Spring width (μm) | Resonance frequency (Hz) | Frequency drift (Hz) |
|---|---|---|
| 1.9 (design value) | 11,160 | 0 |
| 2.1 (process variation of +0.2 μm) | 12,870 | +1,710 |
| 1.7 (process variation of −0.21 μm) | 9,513 | −1,647 |

TABLE three

| Spring width (μm) | Resonance frequency (Hz) | Frequency drift (Hz) |
|---|---|---|
| 4.0 (design value) | 11,064 | 0 |
| 4.2 (process variation of +0.2 μm) | 11,803 | 739 |
| 3.8 (process variation of −0.2 μm) | 10,329 | −735 |

According to Table two and Table three, it is found that when the fabrication process has a variation of +0.2 μm, the resonance frequency of the micro-electro mechanical resonator with the S1-type spring (the conventional spring) is increased by 1710 Hz, and the resonance frequency of the micro-electro mechanical resonator with the S2-type spring (the interdigitated spring) is increased by 739 Hz. It can be seen that the micro-electro mechanical resonator with the interdigitated spring can effectively decrease the resonance frequency drift. Similarly, when the fabrication process has a variation of −0.2 μm, the resonance frequency of the micro-electro mechanical resonator with the S1-type spring (the conventional spring) is increased by 1647 Hz, and the resonance frequency of the micro-electro mechanical resonator with the S2-type spring (the interdigitated spring) is increased by 735 Hz. It can be seen that the micro-electro mechanical resonator with the interdigitated spring can effectively decrease the resonance frequency drift phenomenon. Therefore, under the same fabrication process, the micro-electro mechanical resonator with interdigitated spring can use the a wider spring width to mitigate the influence of process variation, so as to mitigate the resonance frequency drift.

It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims and their equivalents.

What is claimed is:

1. A micro-electro mechanical apparatus, adapted to sense an acceleration, comprising:
   a substrate;
   a first mass;
   a movable electrode, disposed on the first mass along a first axial direction;
   a stationary electrode, disposed on the substrate along the first axial direction, wherein the movable electrode and the stationary electrode have a critical gap there between;
   an anchor; and
   an interdigitated spring, connecting the first mass and the anchor along the first axial direction, and comprising:
      a plurality of first folded portions, wherein each of the first folded portions comprising two first spans and a first head portion configured to connect the two first spans;
      a plurality of first connecting portions, wherein each of the first connecting portions is respectively connected to the first spans of two adjacent first folded portions to define a first space;
      a plurality of second folded portions, wherein each of the second folding portions comprising two second spans and a second head portion configured to connect the two second spans; and
      a plurality of second connecting portions, wherein each of the second connecting portions is respectively connected to the second spans of two adjacent second folded portions to define a second space;
   wherein at least one of the first folded portions is disposed in the second space, and at least one of the second folded portions is disposed in the first space, a width of the first span is greater than the critical gap and a width of the second span is greater than the critical gap.

2. The micro-electro mechanical apparatus as claimed in claim 1, further comprising at least one bridge connecting the first span and the second span.

3. The micro-electro mechanical apparatus as claimed in claim 2, wherein the bridge comprises a first bridge, the first bridge is connected to a portion of the first span which is near the first connecting portion, and the first bridge is connected to a portion of the second span which is near the second head portion.

4. The micro-electro mechanical apparatus as claimed in claim 3, wherein the bridge comprises a second bridge, the second bridge is connected to a portion of the first span which is near the first head portion, and the second bridge is connected to a portion of the second span which is near the second connecting portion.

5. The micro-electro mechanical apparatus as claimed in claim 4, wherein a location of the first bridge and a location of the second bridge are origin symmetric.

6. A micro-electro mechanical apparatus, adapted to sense an angular velocity, comprising:
   a substrate;
   a first mass;
   a second mass;
   a movable electrode, disposed on the second mass along a second axial direction;
   a stationary electrode, disposed on the substrate along the second axial direction, wherein the movable electrode and the stationary electrode have a critical gap there between;
   an anchor; and
   an interdigitated spring, connecting the second mass and the anchor along the second axial direction, and comprising:
      a plurality of first folded portions, wherein each of the first folded portion comprising two first spans and a first head portion configured to connect the two first spans;
      a plurality of first connecting portions, wherein each of the first connecting portions is respectively connected to the first spans of two adjacent first folded portions to define a first space;
      a plurality of second folded portions, wherein each of the second folded portion comprising two second spans and a second head portion configured to connect the two second spans; and
      a plurality of second connecting portions, wherein each of the second connecting portions is respectively connected to the second spans of two adjacent second folded portions to define a second space;
   wherein at least one of the first folded portions is disposed in the second space, and at least one of the second folded portions is disposed in the first space, a width of the first span is greater than the critical gap and a width of the second span is greater than the critical gap.

7. The micro-electro mechanical apparatus as claimed in claim 6, wherein the width of the first span is greater than a resonance spring width and the width of the second span is greater than the resonance spring width.

8. The micro-electro mechanical apparatus as claimed in claim 6, further comprising at least one bridge connecting the first span and the second span.

9. The micro-electro mechanical apparatus as claimed in claim 8, wherein the bridge comprises a first bridge, the first bridge is connected to a portion of the first span which is near the first connecting portion, and the first bridge is connected to a portion of the second span which is near the second head portion.

10. The micro-electro mechanical apparatus as claimed in claim 9, wherein the bridge comprises a second bridge, the second bridge is connected to a portion of the first span which is near the first head portion, and the second bridge is connected to a portion of the second span which is near the second connecting portion.

11. The micro-electro mechanical apparatus as claimed in claim 10, wherein a location of the first bridge and a location of the second bridge are origin symmetric.

12. The micro-electro mechanical apparatus as claimed in claim 6, further comprising another interdigitated spring connecting the first mass and the second mass along a first axial direction, wherein the second mass is a frame.

13. The micro-electro mechanical apparatus as claimed in claim 12, wherein the interdigitated spring connecting the first mass and the second mass along the first axial direction further comprising:
   a plurality of third folded portions, wherein each of the third folded portion comprising two third spans and a third head portion configured to connect the two third spans;
   a plurality of third connecting portions, wherein each of the third connecting portions is respectively connected to the third spans of two adjacent third folded portions to define a third space;
   a plurality of fourth folded portions, wherein each of the fourth folded portion comprising two fourth spans and a fourth head portion configured to connect the two fourth spans; and
   a plurality of fourth connecting portions, wherein each of the fourth connecting portions is respectively connected to the fourth spans of two adjacent fourth folded portions to define a fourth space;
   a third bridge, the third bridge is connected to a portion of the third span which is near the third connecting portion, and the third bridge is connected to a portion of the fourth span which is near the fourth head portion; and
   a fourth bridge, the fourth bridge is connected to a portion of the fourth span which is near the fourth connecting portion, and the forth bridge is connected to a portion of the third span which is near the third head portion;
   wherein a location of the third bridge and a location of the fourth bridge are origin symmetric.

14. A micro-electro mechanical apparatus comprising:
   a substrate;
   at least one mass;
   a movable electrode, disposed on the mass along an axial direction;
   a stationary electrode, disposed on the substrate along the axial direction, wherein the movable electrode and the stationary electrode have a critical gap there between;
   an anchor; and
   an interdigitated spring, connecting the mass and the anchor, and comprising:
      a plurality of first folded portions, wherein each of the first portions comprising two first spans and a first head portion configured to connect the two first spans;
      a plurality of first connecting portions, wherein each of the first connecting portions is respectively connected to the first spans of two adjacent first folded portions to define a first space;
      a plurality of second folded portions, wherein each of the second portions comprising two second spans and a second head portion configured to connect the two second spans; and
      a plurality of second connecting portions, wherein each of the second connecting portions is respectively connected to the second spans of two adjacent second folded portions to define a second space;
   wherein at least one of the first folded portions is disposed in the second space, and at least one of the second folded portions is disposed in the first space, a width of the first span is greater than the critical gap and a width of the second span is greater than the critical gap.

15. The micro-electro mechanical apparatus as claimed in claim 14, wherein the width of the first span is greater than a resonance spring width and the width of the second span is greater than the resonance spring width.

16. The micro-electro mechanical apparatus as claimed in claim 14, further comprising at least one bridge connecting the first span and the second span.

17. The micro-electro mechanical apparatus as claimed in claim 16, wherein the bridge comprises a first bridge, the first bridge is connected to a portion of the first span which is near the first connecting portion, and the first bridge is connected to a portion of the second span which is near the second head portion.

18. The micro-electro mechanical apparatus as claimed in claim 17, wherein the bridge comprises a second bridge, the second bridge is connected to a portion of the first span which is near the first head portion, and the second bridge is connected to a portion of the second span which is near the second connecting portion.

19. The micro-electro mechanical apparatus as claimed in claim 18, wherein a location of the first bridge and a location of the second bridge are origin symmetric.

20. A method for mitigating frequency drift of a micro-electro mechanical apparatus, comprising:
   using an interdigitated spring to connect at least one mass and an anchor of the micro-electro mechanical apparatus, wherein the interdigitated spring comprises:
      a plurality of first folded portions, wherein each of the first folded portions comprises two first spans and a first head portion connecting the two first spans;
      a plurality of first connecting portions, wherein each of the first connecting portions is respectively connected to the first spans of two adjacent first folded portions to define a first space;
      a plurality of second folded portions, wherein each of the second folded portions comprises two second spans and a second head portion connecting the two second spans; and
      a plurality of second connecting portions, wherein each of the second connecting portions is respectively connected to the second spans of two adjacent second folded portions to define a second space; and
   arranging at least one of the first folded portions in the second space, and arranging at least one of the second folded portions in the first space; and defining a width of the first span which is greater than a critical gap and defining a width of the second span which is greater than a critical gap, wherein the critical gap is located between a movable electrode and a stationary electrode of the micro-electro mechanical apparatus.

21. The method for mitigating frequency drift of the micro-electro mechanical apparatus as claimed in claim 20, further comprising defining the width of the first span which is greater than the resonance spring width and defining the width of the second span which is greater than a resonance spring width.

22. The method for mitigating frequency drift of the micro-electro mechanical apparatus as claimed in claim 20, further comprising the step of arranging at least one bridge, the at least one bridge is arranged between the first span and the second span to connect the first span and the second span, wherein the step of arranging at least one bridge comprises:
   disposing a first bridge to connect a portion of the first span which is near the first connecting portion and to connect a portion of the second span which is near the second head portion, disposing the second bridge to connect a portion of the first span which is near the first head portion and to connect a portion of the second span which is near the second connecting portion, wherein the location of the first bridge and the location of the second bridge are origin symmetric.

23. The micro-electro mechanical apparatus as claimed in claim 1, wherein the interdigitated spring comprises:
   a first spring, comprising a first end portion, a second end portion, and the plurality of first folded portions and first connecting portions located between the first end portion and the second end portion, wherein both of the first end portion and the second end portion extend along the first axial direction and respectively connect two outermost first spans at two ends of the first spring to the anchor and the first mass; and
   a second spring, comprising a third end portion, a fourth end portion, and the plurality of second folded portions and second connecting portions between the third end portion and the fourth end portion, wherein both of the third end portion and the fourth end portion extend along the first axial direction and respectively connect two outermost second spans at two ends of the second spring to the anchor and the first mass,
   wherein the first end portion and the third end portion are extended along the same direction and are parallel to each other, the first end portion and the third end portion have a distance therebetween,
   wherein the second end portion and the fourth end portion are extended along the same direction and are parallel to each other, the second end portion and the fourth end portion have a distance therebetween.

24. The micro-electro mechanical apparatus as claimed in claim 6, wherein the interdigitated spring comprises:
   a first spring, comprising a first end portion, a second end portion, and the plurality of first folded portions and first connecting portions located between the first end portion and the second end portion, wherein both of the first end portion and the second end portion extend along the second axial direction and respectively connect two outermost first spans at two ends of the first spring to the anchor and the second mass; and
   a second spring, comprising a third end portion, a fourth end portion, and the plurality of second folded portions and second connecting portions between the third end portion and the fourth end portion, wherein both of the third end portion and the fourth end portion extend along the second axial direction and respectively connect two outermost second spans at two ends of the second spring to the anchor and the second mass,
   wherein the first end portion and the third end portion are extended along the same direction and are parallel to each other, the first end portion and the third end portion have a distance therebetween,
   wherein the second end portion and the fourth end portion are extended along the same direction and are parallel to each other, the second end portion and the fourth end portion have a distance therebetween.

25. The micro-electro mechanical apparatus as claimed in claim 14, wherein the interdigitated spring comprises:
   a first spring, comprising a first end portion, a second end portion, and the plurality of first folded portions and first connecting portions located between the first end portion and the second end portion, wherein both of the first end portion and the second end portion extend along the axial direction and respectively connect two outermost first spans at two ends of the first spring to the anchor and the mass; and
   a second spring, comprising a third end portion, a fourth end portion, and the plurality of second folded portions and second connecting portions between the third end portion and the fourth end portion, wherein both of the third end portion and the fourth end portion extend along the axial direction and respectively connect two outermost second spans at two ends of the second spring to the anchor and the mass,
   wherein the first end portion and the third end portion are extended along the same direction and are parallel to each other, the first end portion and the third end portion have a distance therebetween,
   wherein the second end portion and the fourth end portion are extended along the same direction and are parallel to each other, the second end portion and the fourth end portion have a distance therebetween.

26. The micro-electro mechanical apparatus as claimed in claim 20, wherein the interdigitated spring comprises:
   a first spring, comprising a first end portion, a second end portion, and the plurality of first folded portions and first connecting portions located between the first end portion and the second end portion, wherein both of the first end portion and the second end portion extend along an axial direction and respectively connect two outermost first spans at two ends of the first spring to the anchor and the at least one mass; and
   a second spring, comprising a third end portion, a fourth end portion, and the plurality of second folded portions and second connecting portions between the third end portion and the fourth end portion, wherein both of the third end portion and the fourth end portion extend along the axial direction and respectively connect two outermost second spans at two ends of the second spring to the anchor and the at least one mass,
   wherein the first end portion and the third end portion are extended along the same direction and are parallel to each other, the first end portion and the third end portion have a distance therebetween,
   wherein the second end portion and the fourth end portion are extended along the same direction and are parallel to each other, the second end portion and the fourth end portion have a distance therebetween.

* * * * *